(12) United States Patent
Cawse et al.

(10) Patent No.: US 9,538,334 B2
(45) Date of Patent: Jan. 3, 2017

(54) TELEMATICS FURTHERANCE VISUALIZATION SYSTEM

(71) Applicant: Geotab Inc, Oakville (CA)

(72) Inventors: Neil Charles Cawse, Oakville (CA); Pieter Albert Venter, Oakville (CA); Ilya Basiuk, Minsk (BY)

(73) Assignee: GEOTAB Incorporated, Oakville (CA)

( * ) Notice: Subject to any disclaimer, the term of this patent is extended or adjusted under 35 U.S.C. 154(b) by 155 days.

(21) Appl. No.: 14/597,667

(22) Filed: Jan. 15, 2015

(65) Prior Publication Data

US 2016/0212589 A1 Jul. 21, 2016

(51) Int. Cl.
| | |
|---|---|
| H04W 24/00 | (2009.01) |
| H04W 4/02 | (2009.01) |
| G07B 15/00 | (2011.01) |
| G07C 5/00 | (2006.01) |
| G01C 21/36 | (2006.01) |

(52) U.S. Cl.
CPC .......... *H04W 4/028* (2013.01); *G01C 21/3667* (2013.01); *G07B 15/00* (2013.01); *G07C 5/008* (2013.01)

(58) Field of Classification Search
CPC .................................................... H04M 15/00
USPC ................ 455/456.4, 456.1, 418, 456.3, 345
See application file for complete search history.

(56) References Cited

U.S. PATENT DOCUMENTS

| | | | |
|---|---|---|---|
| 6,845,318 B1 | 1/2005 | Moore et al. | |
| 7,397,351 B1 * | 7/2008 | Rubin | B60Q 9/008 324/457 |
| 8,022,831 B1 * | 9/2011 | Wood-Eyre | B60T 7/14 180/272 |
| 8,032,276 B2 | 10/2011 | Cawse | |
| 8,670,928 B2 | 3/2014 | Cawse | |
| 8,706,348 B2 | 4/2014 | Beams et al. | |
| 2001/0047244 A1 | 11/2001 | Harrison et al. | |
| 2003/0036823 A1 * | 2/2003 | Mahvi | B60K 28/063 701/1 |
| 2006/0106622 A1 * | 5/2006 | Lee | G06Q 30/04 701/117 |
| 2009/0234580 A1 * | 9/2009 | Fernandez-Hernandez | G01C 21/30 701/436 |
| 2010/0057352 A1 * | 3/2010 | Nakae | G01C 21/32 701/532 |
| 2010/0268452 A1 * | 10/2010 | Kindo | G01C 21/30 701/533 |
| 2012/0253862 A1 | 10/2012 | Davidson | |
| 2012/0303266 A1 | 11/2012 | Su et al. | |
| 2012/0314354 A1 * | 12/2012 | Rayner | G06F 1/1656 361/679.01 |

(Continued)

*Primary Examiner* — Joseph Arevalo
(74) *Attorney, Agent, or Firm* — Wolf, Greenfield & Sacks, P.C.

(57) ABSTRACT

A method and apparatus for use in a mobile device telemetry system is disclosed. The method and apparatus relate to a telematics furtherance visualization system. The system can sense mobile device remote observation misalignment risk and reconcile mobile device remote observation alignment by communicating a subsequent log of mobile device vector data for rendering a sequence of next positions in the furtherance of a mobile device. The system can also provide an adaptive rendering based upon a phase shift, a log of mobile device vector data, or predictive rendering until receipt of the next subsequent log of mobile device vector data.

39 Claims, 18 Drawing Sheets

(56) References Cited

U.S. PATENT DOCUMENTS

| | | | | |
|---|---|---|---|---|
| 2013/0126531 A1* | 5/2013 | Hynecek | H05K 5/0217 | |
| | | | 220/315 | |
| 2013/0151138 A1* | 6/2013 | Lu | G09B 29/106 | |
| | | | 701/410 | |
| 2013/0271902 A1* | 10/2013 | Lai | H04R 1/02 | |
| | | | 361/679.01 | |
| 2013/0292269 A1* | 11/2013 | Tages | A45C 11/00 | |
| | | | 206/37 | |
| 2013/0292378 A1* | 11/2013 | Tages | H05K 5/0086 | |
| | | | 220/4.02 | |
| 2013/0294020 A1* | 11/2013 | Rayner | H05K 5/061 | |
| | | | 361/679.01 | |
| 2013/0296004 A1* | 11/2013 | Tages | H05K 5/03 | |
| | | | 455/575.8 | |
| 2014/0055014 A1* | 2/2014 | Pan | H05K 5/02 | |
| | | | 312/223.2 | |
| 2014/0190841 A1* | 7/2014 | Nash | H05K 9/0045 | |
| | | | 206/37 | |
| 2014/0233180 A1* | 8/2014 | Vargas | G06F 1/1632 | |
| | | | 361/679.55 | |
| 2016/0187932 A1* | 6/2016 | Lin | G06F 1/1656 | |
| | | | 361/679.09 | |

* cited by examiner

TELEMATICS FURTHERANCE VISUALIZATION SYSTEM

TECHNICAL FIELD OF THE INVENTION

The present invention generally relates to a method and apparatus for a telemetry furtherance visualization system. More specifically, the present invention relates to visualizing the advancement of a mobile device as a rendered graphical representation on a digital display based upon a series of historical logs of mobile device vector data.

BACKGROUND OF THE INVENTION

Mobile Telemetry systems with mobile device rendering capabilities are known in the prior art. Mobile information may be sensed, logged as data and transmitted for subsequent data processing and rendering on a computing device. Data transmission and rendering on a digital map may be based upon different approaches to receiving a log of data. The log of data may be received randomly and unexpected in time, periodic or expected at a repeating point in time as well as aperiodic irregular points in time. The random and aperiodic approaches can result in rendering positional errors on a graphical map of a computing device.

U.S. Pat. No. 6,845,318 issued on Jan. 18, 2005 to Moore et al. al. and relates to methods, data structures and systems that provide techniques for processing track logs. A track log is represented as a number of track points. The track points represent geographic positions previously traveled. The track log and the track points are overlaid on a map and presented on a display in communication with a portable navigation device. Track points are graphically selected and identified via the display. Any graphically selected track point is also associated with a selectable operation for immediate, automatic and/or subsequent execution on a portable navigation device.

United States patent application US201/0047244 published on Nov. 29, 2001 to Harrison and Morris. This patent application relates to a data monitoring apparatus including a GPS receiver, a micro controller, a number of sensors, a number of actuators, memory, a radio transmitter and a data communication antennae. The apparatus accumulates real time data concerning position and time and other operational parameters of a geographically mobile object such as a vehicle for transmission to a monitoring station. Transmission channel utility may be improved through transmission of accumulated historical data to a separate monitoring station.

United States patent application US2012/0253862 published on Oct. 4, 2012 to Davidson. This patent application relates a fleet management computer system configured for providing a fleet management user interface. According to various embodiments, the fleet management computer system is configured for assessing operational data to determine a vehicle travel path and one or more operational characteristics indicated by the operational data. In addition, according to various embodiments, the fleet management computer system is configured for generating a graphical user interface that include an evaluation results display showing the operational characteristics and a geographical map showing the vehicle travel path.

United States patent application US2012/0303266 published on Nov. 29, 2012 to Su et. al. and relates to a mobile computing device that can determine a first waypoint distance that indicates a distance from the device's location within which a first waypoint of a route cannot be located. This distance can be sent to a server as part of a map data request. The distance can be based on a device velocity, a request latency time, an instruction intake time and an instruction reaction time. The request latency time represents the delay from sending a request to receiving route information in response. The instruction intake time represents the time it takes for a user to read or listen to a first waypoint instruction. The instruction reaction time represents the time it takes a user to react to a first waypoint instruction. Route information contains information identifying a first waypoint that is further away from the device position supplied with the request than the first waypoint distance.

U.S. Pat. No. 8,706,348 issued on Apr. 22, 2014 to Beams and Cawse. This patent relates to a mobile telemetry apparatus, operable to initiate a telemetry processing operation in response to an aperiodic, non-random trigger signal cued by a sensed, operationally variable mobile condition. A trigger unit provides the trigger signal that in turn switches the telemetry apparatus from a resource-conserving idle state to a state in which a session initiates, so that operationally salient variations in information changes in vehicle sensor data may be detected and processed.

U.S. Pat. No. 8,032,276 issued on Oct. 4, 2011 to Cawse and U.S. Pat. No. 8,670,928 issued on Mar. 11, 2014 to Cawse. These patents relate to an apparatus and method for optimally recording or transmitting positional data and events of an object. The apparatus includes an input means to continuously provide positional data to a microprocessor and a memory device to store selected positional data. The microprocessor is programmed to compare new positional data from the input means to previously recorded log of positional data and creates a new log if the new positional data differs from the previously recorded log in accordance with pre-determined parameters.

The prior art approaches and in particular the approaches to rendering the position of a mobile device on a graphical display are deficient. The prior art approaches may result in visualization positional errors or inconsistent erratic rendering of the position of a mobile device when based upon the receipt of a series of historical logs of mobile device vector data.

SUMMARY OF THE INVENTION

The present invention relates to aspects in a mobile device telemetry system and provides a new furtherance visualization capability for rendering the position of a mobile device on a graphical display of a computing device based upon a series of historical logs of mobile device vector data.

The present invention is directed to aspects in a telematics furtherance visualization system. The system can sense a mobile device and remote observation misalignment risk and reconcile the alignment by communicating a subsequent log of mobile device vector data for rendering a sequence of next positions in the furtherance of a mobile device. The system can also provide an adaptive rendering based upon a phase shift, a log of mobile device vector data, or predictive rendering until receipt of the next subsequent log of mobile device vector.

According to a first broad aspect of the invention, there is a telematics furtherance visualization method. The method includes a first distributed process for a mobile device and a second distributed process for a remote device. The first distributed process and the second distributed process capable of communicating messages and data. The first distributed process capable to monitor the mobile device to log and communicate mobile device vector data to the remote device. The first distributed process also capable to sense a mobile device remote observation misalignment risk and reconcile mobile device remote observation alignment. The second distributed process capable to adaptive render a graphical image of the mobile device from the mobile device vector data.

According to a second broad aspect of the invention, there is a telematics furtherance visualization apparatus. The apparatus includes at least one mobile device. The mobile device includes a microprocessor, memory and firmware. The microprocessor, memory and firmware capable of executing a first distributed process. The apparatus includes at least one remote device. The remote device includes a microprocessor memory and software. The microprocessor, memory and software capable of executing a second distributed process. The at least one mobile device and the at least one remote device capable of communication. A first distributed process for a mobile device and a second distributed process for a remote device. The first distributed process and the second distributed process capable of communicating messages and data. The first distributed process capable to monitor said mobile device to log and communicate mobile device vector data to the remote device. The first distributed process capable to sense a mobile device remote observation misalignment risk and reconcile mobile device remote observation alignment. The second distributed process capable to adaptive render a graphical image of the mobile device from the mobile device vector data.

The mobile device remote observation misalignment risk may also include mobile device remote observation alignment parameters, the adaptive render may also include adaptive render parameters and the mobile device remote observation alignment parameters and the adaptive render parameters may also be correlated.

The reconcile mobile device remote observation alignment may also include communicating a subsequent log of the mobile device vector data.

The mobile device vector data may also include at least one data point of a position indication, a speed indication or a heading indication of the mobile device and at least one time stamp associated with each data point.

The mobile device remote observation alignment parameters may also be based upon at least one of a position limit, a speed limit, a heading limit or a path segment limit.

The adaptive render parameters may also be based upon at least one of a phase shift, a data render, or a predictive render.

The mobile device remote observation alignment parameters may also be based upon at lease one of a position limit, a speed limit, a heading limit or a path segment limit and the adaptive render parameters may also be based upon at least one of a phase shift, a data render, or a predictive render.

In an embodiment of the invention, the path segment limit is 100 raw data points of mobile device vector data and the phase shift is in the range between −4.5 seconds and −13.5 seconds.

In another embodiment of the invention, the path segment limit is 100 raw data points of mobile device vector data and the phase shift is substantially −9 seconds.

The mobile device remote observation alignment parameters may also be based upon a combination of at least two of a position limit, a speed limit, a heading limit, or a path segment limit.

The adaptive render parameters may also be based upon a combination of at least two of a phase shift, a data render, or a predictive render.

The mobile device remote observation alignment parameters and the adaptive render parameters may also be correlated to command a predictive render.

The mobile device remote observation alignment parameters and the adaptive render parameters may also be calibrated to command a predictive render.

The method and apparatus may also be capable to sense a potential mobile device remote observation misalignment risk based upon checking the mobile device remote observation alignment parameters.

The method apparatus may also include checking the mobile device remote observation alignment parameters to enable the reconcile mobile device remote observation.

The method and apparatus wherein the capable to adaptive render is based upon the adaptive render parameters.

The method and apparatus wherein the checking the mobile device remote observation alignment parameters determines a mobile device remote observation misalignment risk based upon a position varying beyond a limit.

The method and apparatus wherein the checking the mobile device remote observation alignment parameters determines a mobile device remote observation misalignment risk based upon a speed limit.

The method and apparatus wherein the checking the mobile device remote observation alignment parameters determines a mobile device remote observation misalignment risk based upon a heading limit.

The method and apparatus wherein the checking the mobile device remote observation alignment parameters determines a mobile device remote observation misalignment risk based upon a path segment represented by a number of raw data points.

The mobile device remote observation alignment parameters and the adaptive render parameters may be recalibrated.

Recalibrated may also be at least one of the mobile device remote observation alignment parameters or the adaptive render parameters.

The method and apparatus may also include a heartbeat to further command a predictive render.

These and other aspects and features of non-limiting embodiments are apparent to those skilled in the art upon review of the following detailed description of the non-limiting embodiments and the accompanying drawings.

BRIEF DESCRIPTION OF THE DRAWINGS

Exemplary non-limiting embodiments of the present invention are described with reference to the accompanying drawings in which.

The drawings are not necessarily to scale and may be diagrammatic representations of the exemplary non-limiting embodiments of the present invention.

DETAILED DESCRIPTION

Telematics Communication System

Figure 1:
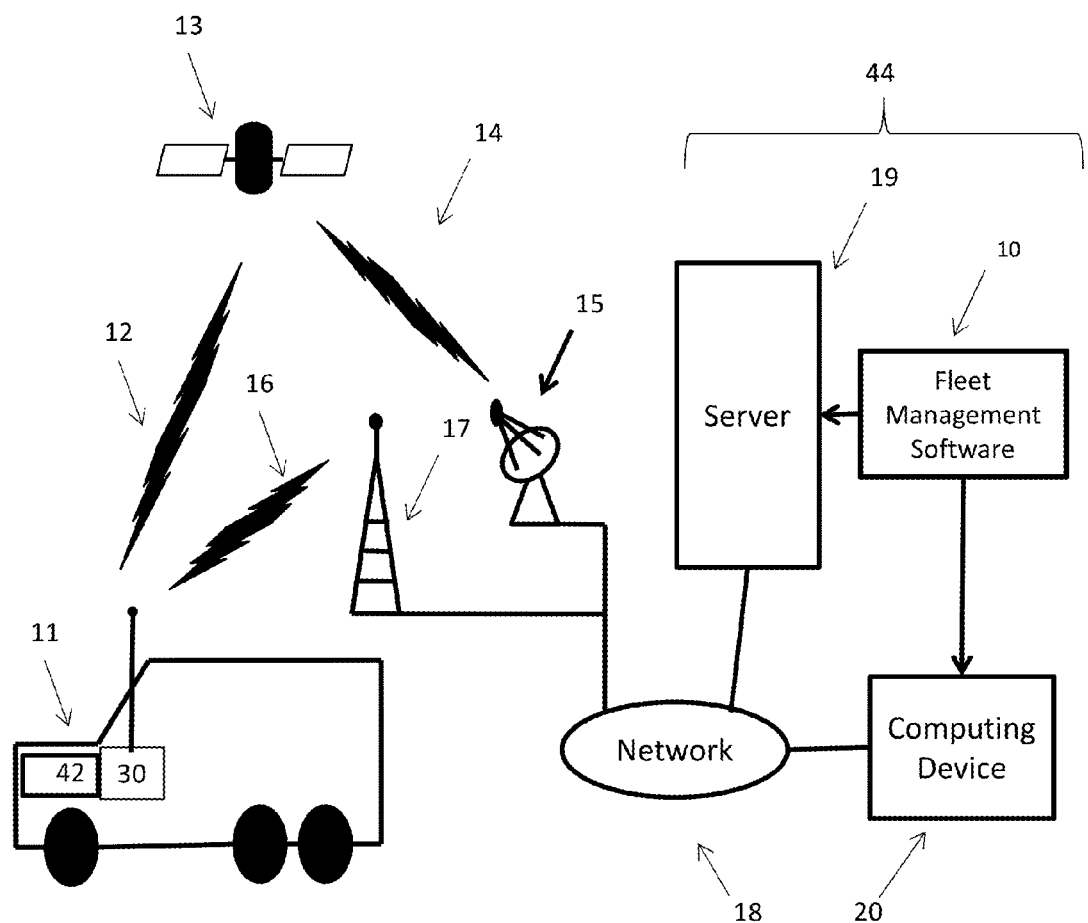
FIG. 1 is a high level diagrammatic view of a mobile device telematics communication system.

Referring to FIG. 1 of the drawings, there is illustrated a high level overview of a telematics communication system. There is at least one mobile device, for example, a vehicle generally indicated at 11. Persons skilled in the art will appreciate other types of mobile devices are within the scope of the invention. The mobile device 11 includes a telemetry hardware system 30 and optionally a resident portion 42.

The telematics communication system provides communication and exchange of data, mobile device vector data, information, commands, and messages between components in the system such as at least one server 19, at least one computing device 20 and at least one mobile device 11. The computing device 20 may be a desktop device or further include other hand held devices or wearable devices.

In one example, the communication 12 is to/from a satellite 13. The mobile device 11 communicates with the satellite 13 that communicates with a ground-based station 15 that communicates with a computer network 18. In an embodiment of the invention, the mobile telemetry hardware system 30 and the remote site 44 (FIG. 1 and FIG. 2) facilitates communication 12 to/from the satellite 13. An example mobile telemetry hardware system 03 is the GEOTAB™ vehicle-tracking device (GO™).

In another example, the communication 16 is to/from a cellular network 17. The mobile device 11, and server 19 or computing device 20 connected to a network 18 communicates over the cellular network 17. In an embodiment of the invention, communication 16 to/from the cellular network 17 is facilitated by the mobile telemetry hardware system 30 and the remote site 44 components.

Computing device 20 and server 19 communicate over the computer network 18. The server 19 may include a database and fleet management software 10 that runs on a server 19. Clients operating a computing device 20 communicate with the application fleet management software 10 running on the server 19 or computing device 20. Alternative, access to the fleet management software 10 may be provided through cloud computing. An example fleet management software 10 system is the myGEOTAB™ product.

In an embodiment of the invention, data, mobile device vector data, information, commands, and messages may be sent from the mobile telemetry hardware system 30 to the cellular network 17, to the network 18, and to the server 19. Computing devices 20 may access the data, mobile device vector data and information on the server 19. Alternatively, data, information, commands, and messages may be sent from the computing device 20 or the server 19, to the network 18, to the cellular network 17, and to the mobile telemetry hardware system 30.

In another embodiment of the invention, data, mobile device vector data, information, commands, and messages may be sent from mobile telemetry hardware system to the satellite 13, the ground based station 15, the network 18, and to the server 19. Computing devices 20 may access data, mobile device vector data and information on the server 19. In another embodiment of the invention, data, information, commands, and messages may be sent from the server 19, to the network 18, the ground based station 15, the satellite 13, and to a mobile telemetry hardware system.

In another embodiment of the invention, data, mobile device vector data, information, commands, and messages may be exchanged between the mobile telemetry hardware system 30 and the computing device 20 over a satellite 13 based network or a cellular network 17. Alternatively, the data, mobile device vector data, information, commands, and messages may be exchanged between the mobile telemetry hardware system 30 and the server 19 over a satellite 13 based network or a cellular network 17.

Mobile Telemetry Hardware System

Figure 2:
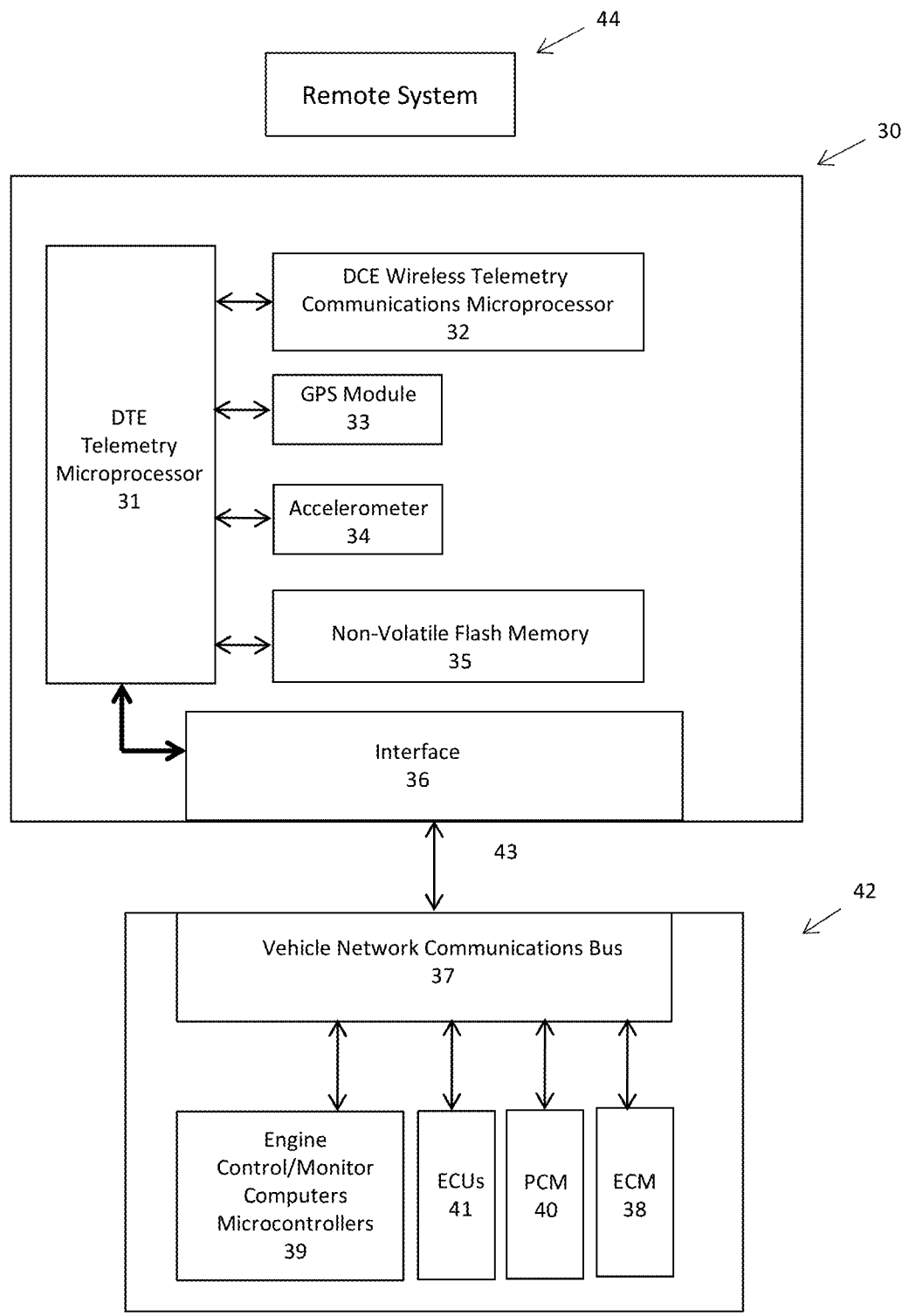
FIG. 2 is diagrammatic view of an mobile telemetry hardware system including an on-board portion and a resident mobile portion.

Referring now to FIG. 2 of the drawings, there is illustrated a mobile telemetry hardware system generally indicated at 30 and a remote site generally indicated at 44. An on-board portion generally includes: a DTE (data terminal equipment) telemetry microprocessor 31; a DCE (data communications equipment) wireless telemetry communications microprocessor 32; a GPS (global positioning system) module 33; an accelerometer 34; a non-volatile flash memory 35; and provision for an OBD (on board diagnostics) interface 36 for connection 43 and communication with a vehicle network communications bus 37.

The resident mobile portion 42 generally includes: the vehicle network communications bus 37; the ECM (electronic control module) 38; the PCM (power train control module) 40; the ECUs (electronic control units) 41; and other engine control/monitor computers and microcontrollers 39.

While the system is described as having an on-board portion 30 and a resident mobile portion 42, it is also understood that the present invention could be a complete resident mobile system or a complete on-board system. In addition, in an embodiment of the invention, a mobile telemetry system includes a mobile system and a remote system 44. The mobile system is the mobile telemetry hardware system 30. The mobile telemetry hardware system 30 is the on-board portion and may include the resident mobile portion 42. In further embodiments of the invention the remote system 44 may be one or all of the server 19, computing device 20, and fleet management software 10.

In an embodiment of the invention, the DTE telemetry microprocessor 31 includes an amount of internal flash memory for storing firmware to operate and control the overall system 30. In addition, the microprocessor 31 and firmware log data, log mobile device vector data, format messages, receive messages, and convert or reformat messages. In an embodiment of the invention, an example of a DTE telemetry microprocessor 31 is a PIC24H microcontroller commercially available from Microchip Corporation.

The DTE telemetry microprocessor 31 interconnects with an external non-volatile flash memory 35. In an embodiment of the invention, an example of the flash memory 35 is a 32 MB non-volatile flash memory store commercially available from Atmel Corporation. The flash memory 35 of the present invention is used for data logging.

The DTE telemetry microprocessor 31 interconnects for communication to the GPS module 33. In an embodiment of the invention, an example of the GPS module 33 is a Neo-5 commercially available from u-blox Corporation. The Neo-5 provides GPS receiver capability and functionality to the mobile telemetry hardware system 30. Alternatively, the DTE telemetry microprocessor 31 may interconnect for communication with an external GPS module through an interface (not shown). The GPS module provides position data and speed data to the DTE telemetry microprocessor 31 and non-volatile flash memory 35.

The DTE telemetry microprocessor is further interconnected with the OBD interface 36 for communication with the vehicle network communications bus 37. The vehicle network communications bus 37 in turn connects for communication with the ECM 38, the engine control/monitor computers and microcontrollers 39, the PCM 40, and the ECU 41.

The DTE telemetry microprocessor has the ability through the OBD interface 36 when connected to the vehicle network communications bus 37 to monitor and receive vehicle data and information from the resident mobile system components for further processing.

As a brief non-limiting example of vehicle data and information, the list may include: vehicle identification number (VIN), current odometer reading, current speed, engine RPM, battery voltage, engine coolant temperature, engine coolant level, accelerator peddle position, brake peddle position, various manufacturer specific vehicle DTCs (diagnostic trouble codes), tire pressure, oil level, airbag status, seatbelt indication, emission control data, engine temperature, intake manifold pressure, transmission data, braking information, and fuel level. It is further understood that the amount and type of vehicle data and information will change from manufacturer to manufacturer and evolve with the introduction of additional mobile technology.

The DTE telemetry microprocessor 31 interconnects for communication with the DCE wireless telemetry communications microprocessor 32. In an embodiment of the invention, an example of the DCE wireless telemetry communications microprocessor 32 is a Leon 100 commercially available from u-blox Corporation. The Leon 100 provides mobile communications capability and functionality to the mobile telemetry hardware system 30 for sending and receiving data to/from a remote site 44. Alternatively, the communication device could be a satellite communication device such as an Iridium™ device interconnected for communication with the DTE telemetry microprocessor 31. Alternatively, there could be a DCE wireless telemetry communications microprocessor 32 and an Iridium™ device for satellite communication. This provides the mobile telemetry hardware system 30 with the capability to communicate with at least one remote site 44.

In embodiments of the invention, a remote system 44 could be another vehicle 11 or a base station or other computing device (not shown). The base station may include one or more servers 19 and one or more computers 20 connected through a computer network 18 (see FIG. 1). In addition, the base station may include fleet management application software 10 for data acquisition, analysis, and sending/receiving commands or messages to/from the mobile telemetry hardware system 30.

The DTE telemetry microprocessor 31 interconnects for communication with an accelerometer (34). An accelerometer (34) is a device that measures the physical acceleration experienced by an object. Single and multi-axis models of accelerometers are available to detect the magnitude and direction of the acceleration, or g-force, and the device may also be used to sense orientation, coordinate acceleration, vibration, shock, and falling.

In an embodiment of the invention, an example of a multi-axis accelerometer (34) is the LIS302DL MEMS Motion Sensor commercially available from STMicroelectronics. The LIS302DL integrated circuit is an ultra compact low-power three axes linear accelerometer that includes a sensing element and an IC interface able to take the information from the sensing element and to provide the measured acceleration data to other devices, such as a DTE Telemetry Microprocessor (31), through an I2C/SPI (Inter-Integrated Circuit) (Serial Peripheral Interface) serial interface. The LIS302DL integrated circuit has a user-selectable full-scale range of +−2 g and +−8 g, programmable thresholds, and is capable of measuring accelerations with an output data rate of 100 Hz or 400 Hz.

Alternatively, the mobile device 30 may not include an integral GPS module 33 or may not include a DCE wireless telemetry communications processor 32. With this alternative embodiment of the mobile device 30, an I/O expander (not shown) provides an interface between the DTE telemetry microprocessor 31 and an external GPS module 33 or a DCE wireless telemetry communications processor 32.

The mobile telemetry hardware system 30 receives data and information from the resident mobile portion 42, the GPS module 33, and the accelerometer 43. The data and information is stored in non-volatile flash memory 35 as a data log. The data log (including mobile device vector data) may be transmitted by the mobile telemetry hardware system 30 over the mobile telemetry communication system to the server 19 or computing device 20 (see FIG. 1). The transmission may be controlled and set by the mobile telemetry hardware system 30 at pre-defined intervals or aperiodic intervals. The transmission may also be triggered because of an event such as a harsh event or an accident. The transmission may further be requested by a command sent from the application software running on the server 19.

Figure 13A:
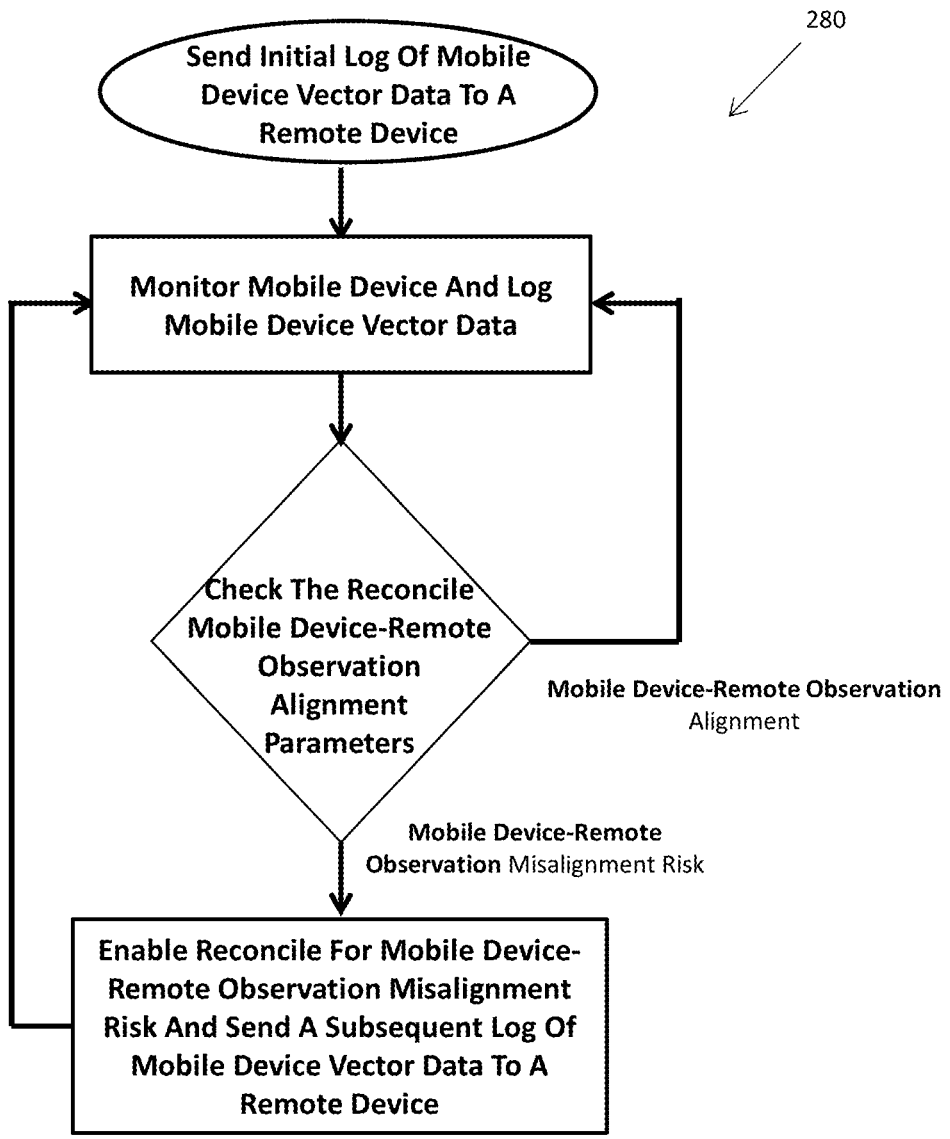
FIG. 13a is a flow chart illustrating the logic of a telematics furtherance visualization system mobile device distributed process.
Figure 13B:
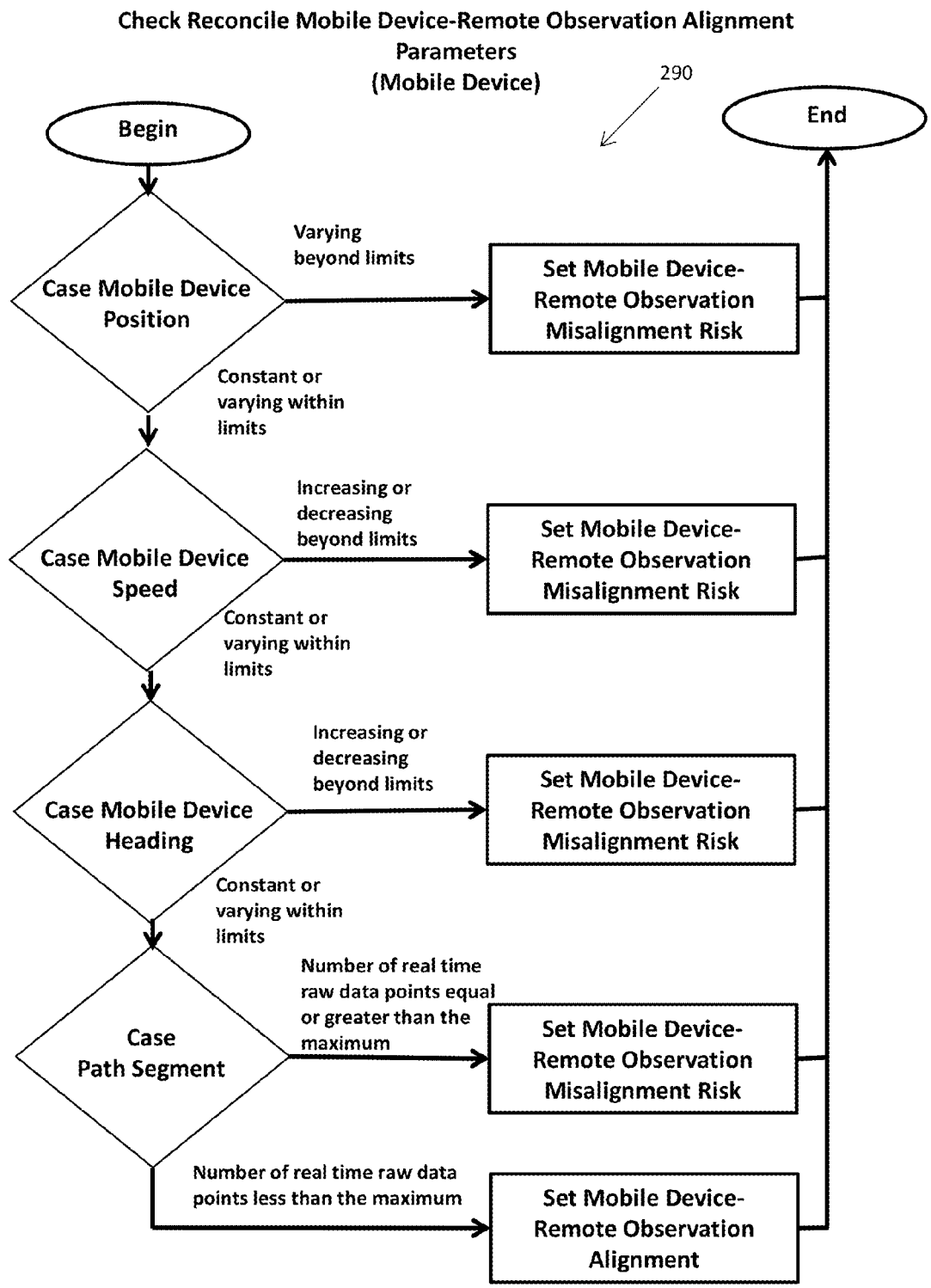
FIG. 13b is a flow chart of the check reconcile mobile device-remote observation alignment parameters sub process.

The DTE telemetry microprocessor 31 and non-volatile flash memory 35 cooperate to store and execute the firmware, logic, associated data and mobile device vector data for the telematics furtherance visualization system process (Mobile Device) 280, 290 (see FIG. 13a and FIG. 13b). The GPS module 33 provides mobile device position data and optionally speed data to the DTE telemetry microprocessor 31 and non-volatile flash memory 35 for use with the telematics mobile device furtherance visualization system process 280. Heading data may also be determined and logged. The DCE wireless telemetry communications microprocessor 32 provides the communication capability to send initial mobile device vector data to a remote device and subsequent mobile device vector data to a remote system 44.

The remote system 44 components (server 19, computing device 20) cooperate to access the fleet management software 10. The fleet management software 10 cooperates to execute the logic and associated data and mobile device vector data for the telematics furtherance visualization system process (Remote Device) 300 (see FIG. 14).

Time Based Mobile Device Positions and Potential Rendering Errors

Figure 3:
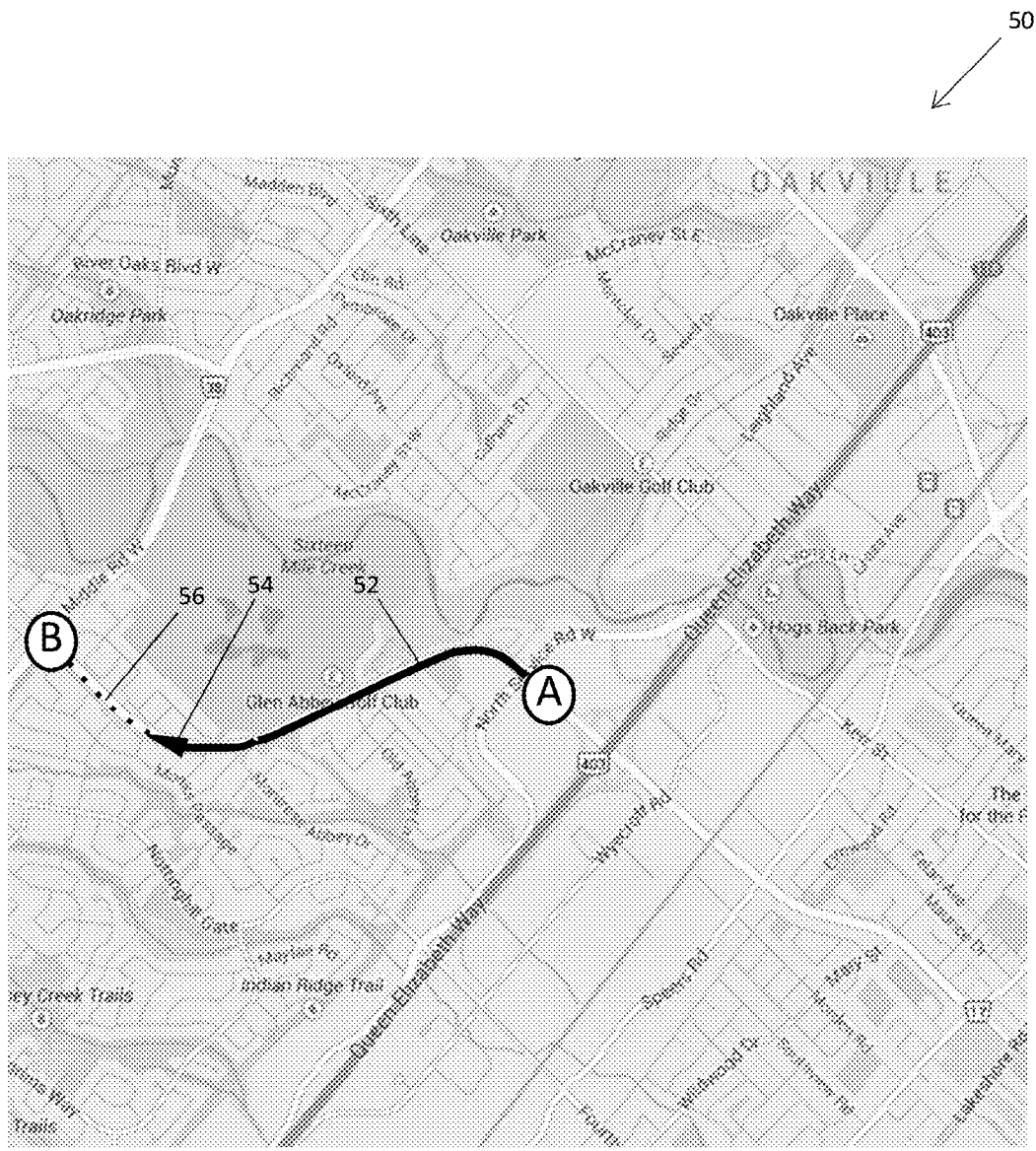
FIG. 3 is an example illustration of observer time based rendering of a mobile device graphical image on a graphical display of a remote device.
Figure 4:
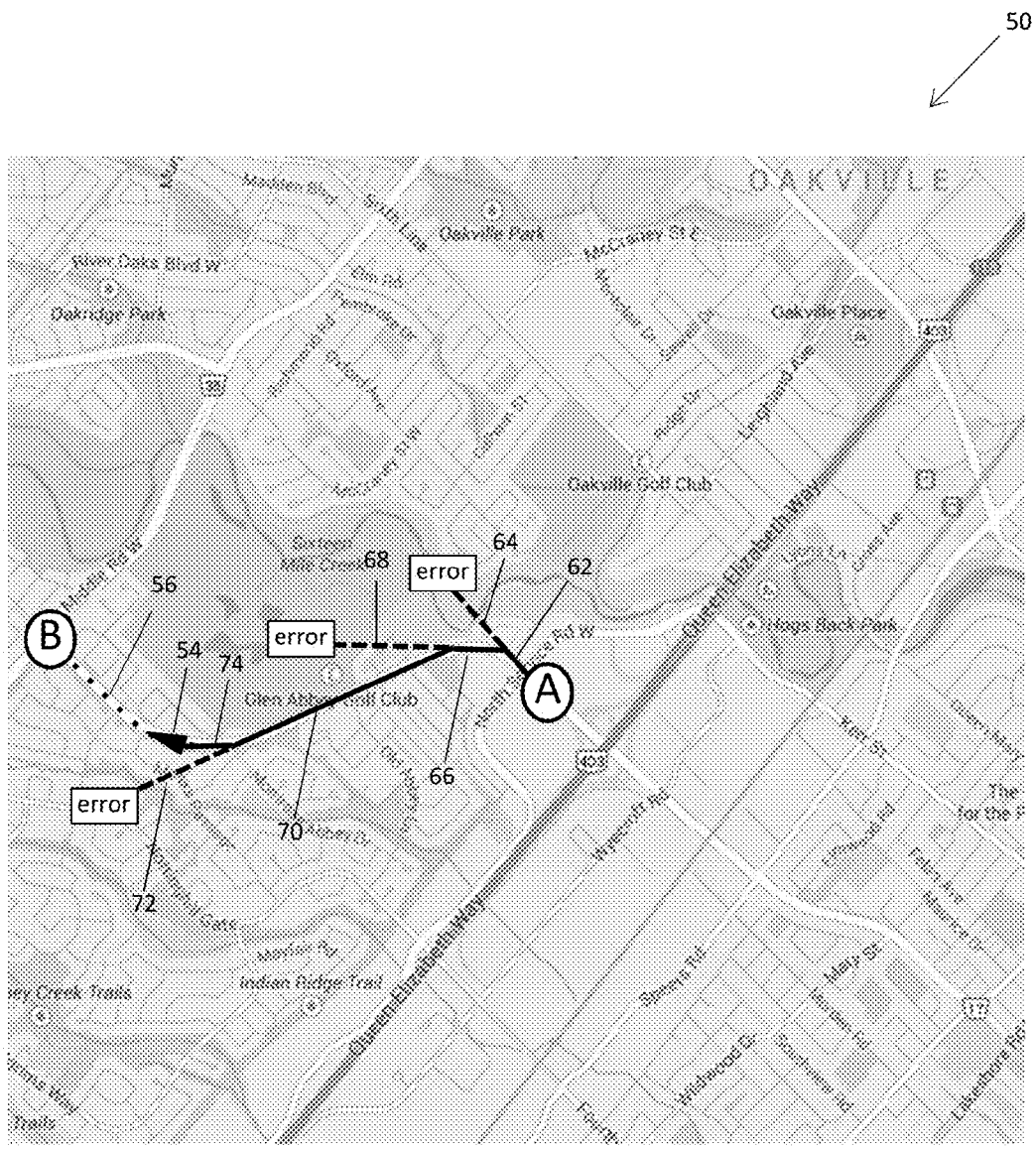
FIG. 4 is an example illustration of observer time based rendering a mobile device on a graphical image on a graphical display of a remote device with potential rendering errors.
Figure 5:
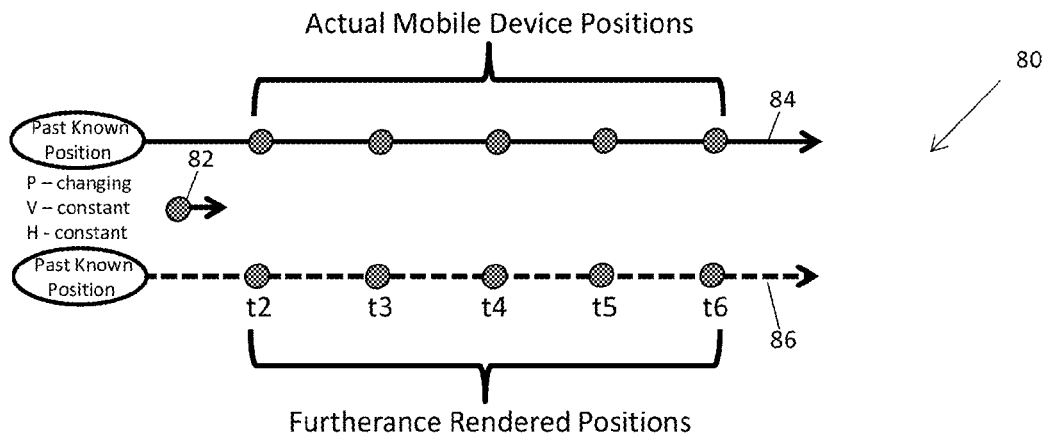
FIG. 5 is an example illustration of mobile device actual positions and furtherance visualization render positions for a relatively constant velocity and constant speed of the mobile device.
Figure 6A:
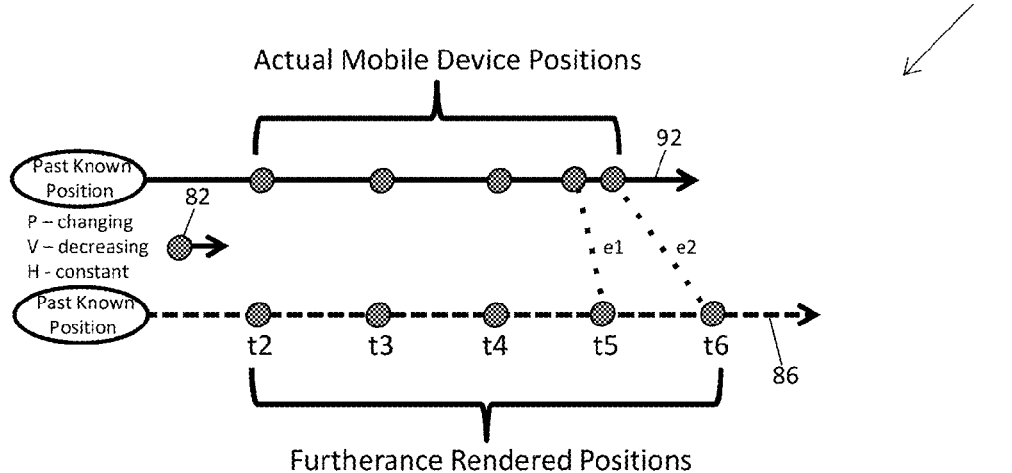
FIG. 6a is an example illustration of mobile device actual positions and furtherance visualization render positions with potential rendering errors as a consequence of a mobile device decreasing speed.
Figure 6B:
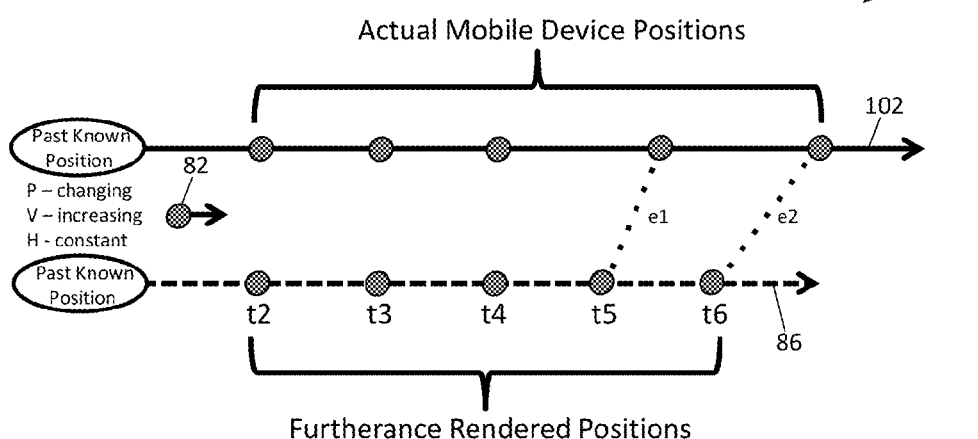
FIG. 6b is an example illustration of mobile device actual positions and furtherance visualization render positions with potential rendering errors as a consequence of a mobile device increasing speed.
Figure 7A:
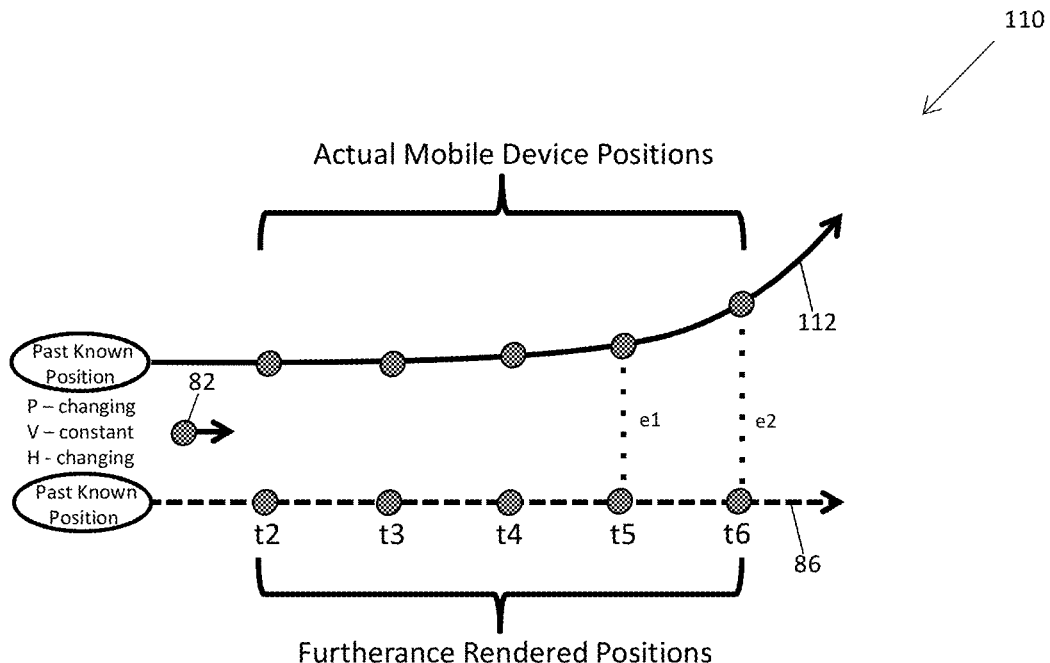
FIG. 7a is an example illustration of mobile device actual positions and furtherance visualization render positions with potential rendering errors as a consequence of a left or decreasing heading change.
Figure 7B:
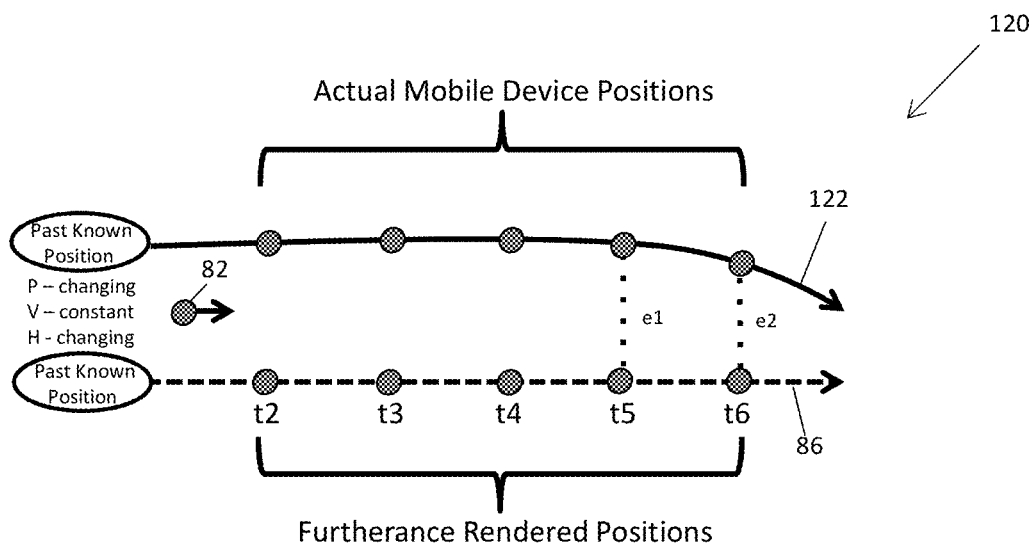
FIG. 7b is an example illustration of mobile device real positions and furtherance visualization render positions with potential rendering errors as a consequence of a right or increasing heading change.

Time based positions of a mobile device and potential rendering errors of a graphical image 54 of a mobile device travelling along a path segment 56 from point A to point B is next described with reference to FIGS. 3 and 4.

Monitoring a mobile device 11 occurs by the telemetry hardware system 30 and associated firmware creating a log of mobile device vector data. A log of mobile device vector data includes at least one data point and mobile device vector data includes at least one of a position (latitude and longitude), speed or heading. Each data point is further associated with a corresponding time stamp. Sequential logs of mobile device vector data are communicated over time to a remote system 44. Upon receipt of the mobile device vector data, the remote system 44 renders a moving graphical image 54 upon a map 50 of a digital display of a computing device 20.

In this first example (FIG. 3), the mobile device starts at point A and travels along a desired curvilinear path segment 56 to the destination point B. For this example, both memory to store data and communication bandwidth are unrestricted and there is a relatively small amount of delay between logging the mobile device vector data and subsequent communication of the log of mobile device vector data to the remote system 44. The time between receipts of sequential logs of mobile device vector data by the remote device 44 is minimal such that a subsequent log is received before rendering the current log is completed. This permits a contiguous rendering based upon the sequential logs of mobile device vector data without the need for adaptive rendering of the graphical image 54 on a map 50. As the mobile device 11 travels along the desired curvilinear path segment 56, the graphical image 54 of the mobile device 11 is rendered and updated to reveal the path traveled 52 by the mobile device 11 without any associated potential rendering errors for the rendered path traveled 52.

However, memory to store data and communication bandwidth tend to be restricted or limited in telemetry systems due to capacity and expense. As a result, communication of sequential logs of mobile device vector data to the remote system 44 can be delayed or aperiodic depending upon the techniques to communicate the logs and minimize the timing and amount of communication to reduce cellular or satellite expense. In addition, techniques to compress the mobile device vector data, optimize the mobile device vector data or minimize the data may also render the amount of data points in each log of mobile device vector data different and may introduce aperiodic dependencies.

In a second example (FIG. 4), communication of subsequent logs of mobile device vector data may be delayed or aperiodic or contain different amounts of data points in each subsequent log of mobile device vector data. This may introduce a risk for potential rendering errors. A delay in receipt of a subsequent log may cause a misalignment between the mobile device 11 and the remote system 44 that renders the image 54 on a graphical display of the remote device 44. This further requires the remote device 44 to continue rendering positions of the mobile device 11 based upon predicting the furtherance or advancement (future or next positions) of a mobile device 11 from the current log of mobile device vector data. If the remote device 44 completes rending of the mobile device 11 based upon the current log and before receipt of the next subsequent log in the sequence, the remote device 44 must render predicted positions of the mobile device based upon the current log of mobile device vector data or pause rendering the graphical image 54.

The mobile device begins at point A and travels the desired curvilinear path segment 56 to the destination point B. The graphical image 54 is rendered upon the map 50. Rendering begins along the first path portion 62 and due to the communication delay or irregular timing of the communication of a subsequent log of mobile device vector data, a first rendering positional error 64 occurs. Upon receipt of a subsequent log of mobile device vector data, the remote device 44 corrects the first rendering positional error 64 and renders the mobile device along the second path portion 66. Then, a second rendering positional error 68 occurs due to another communication delay or irregular timing of the communication of a subsequent log of mobile device vector data. Upon receipt of the next log of mobile device vector data in the sequence, the remote device 44 corrects the second rendering positional error 68 and renders the mobile device along the third path portion 70 until the next rendering positional error 72 occurs and subsequent correction along the next path portion 74. As illustrated in FIG. 4, the frequency and extent of the risk and associated rending errors is unpredictable and irregular resulting in a deficient representation of the path traveled by mobile device 11 on the map 50.

Potential Rendering Errors and Categories of Mobile Device-Remote Observation Alignment and Misalignment Risks The different categories, combinations of potential rendering errors and mobile device-remote observation alignment and misalignment risk are next described with reference to FIGS. 5, 6a, 6b, 7a, 7b, 8a, 8b, 8c, 8d and 8e.

The mobile device furtherance rendered positions 86 may be accurately predicted and rendered between receipt of subsequent logs of mobile device vector data 82 when the change in position of the mobile device 11 occurs with a relatively constant speed and relatively constant heading on a relatively linear path segment. This is generally indicated at 80 in FIG. 5. In this situation, the actual mobile device positions 84 are in mobile device-remote observation alignment with the furtherance rendered positions 86 and the data points in the log of mobile device vector data 82 reflect the relatively constant speed and relatively constant heading. Alternatively, the speed and heading may be derived from the data points of positional data to reveal the speed and heading information.

A first type of potential rending error (FIG. 6a) can occur when the mobile device 11 decreases speed on a relatively constant heading or relatively linear path segment. This causes a decreasing speed mobile device-remote observation misalignment 90 over time between the actual mobile device positions 92 and the mobile device furtherance rendered positions 86. The potential error (e1, e2) increases between data points in subsequent logs of mobile device vector data 82.

A second type of potential rendering error (FIG. 6b) can occur when the mobile device 11 increases speed on a relatively constant heading or straight path segment. This causes an increasing speed mobile device-remote observation misalignment 100 over time between the actual mobile device positions 102 and the mobile device furtherance rendered positions 86. The potential error (e1, e2) increases between data points in subsequent logs of mobile device vector data 82.

A third type of potential rendering error (FIG. 7a) can occur when the mobile device 11 decreases (left or counterclockwise turn) a heading with a relatively constant speed. This causes a decreasing heading mobile device-remote observation misalignment 110 over time between actual mobile device positions 112 and the mobile device furtherance rendered positions 86. The potential error (e1, e2) increases between data points in subsequent logs of mobile device vector data 82.

A forth type of potential rendering error (FIG. 7b) can occur when the mobile device 11 increases (right or clockwise turn) a heading with a relatively constant speed. This causes an increasing heading mobile device-remote observation misalignment 120 over time between the actual mobile device positions 122 and the mobile device furtherance rendered positions 86. The potential error (e1, e2) increases between data points in subsequent logs of mobile device vector data.

In summary, there are four distinct types of potential rendering errors that may occur alone or in combinations of speed and heading changes. These potential rendering errors also relate to a transition from a relatively linear path segment to a relatively curved path segment. When the mobile device-remote observation misalignment and potential rendering errors occur in a combination, the error increases faster over time.

The four distinct types of potential rendering errors along a portion of a path segment can be additionally grouped into categories and combined in different sequences to represent many different path segments as illustrated by the five example scenarios illustrated in FIGS. 8a, 8b, 8c, 8d and 8e.

Figure 8A:
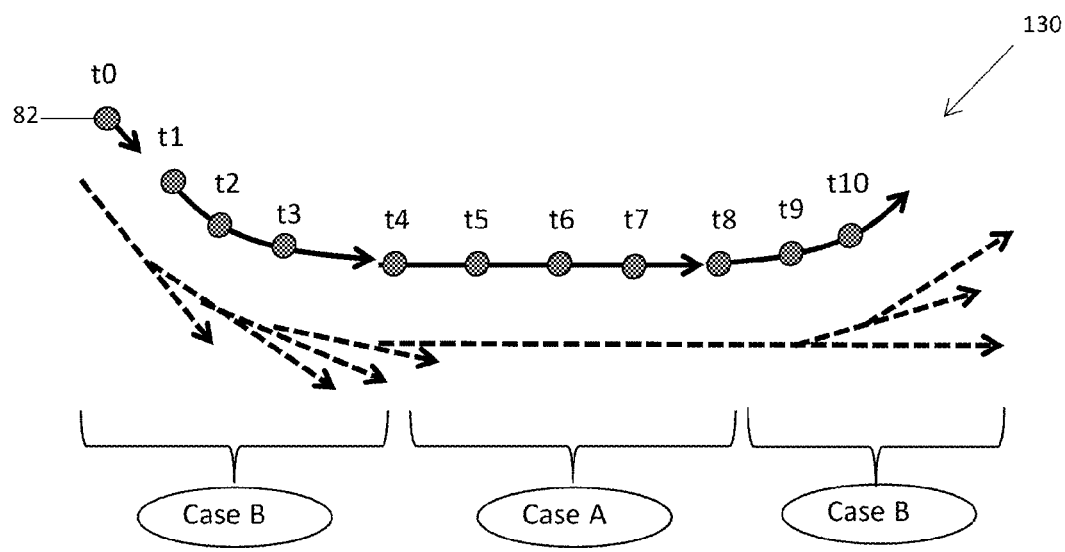
FIG. 8a is an example illustration of first scenario of a mobile device travelling along a path segment with real positions and a category of potential rendering error arising from decreasing heading changes.

The path segment for example scenario one is generally indicated at 130 in FIG. 8a. This path segment example begins with Case B, an area of mobile device-remote observation misalignment risk. This is followed by a transition to a segment of mobile device-remote observation alignment, Case A. Then the path segment concludes with a second occurrence of Case B. Case A occurs for a relatively linear path segment where the speed and heading of the mobile device 11 are relatively constant. Case B occurs primarily due to a decreasing heading of the mobile device 11.

Figure 8B:
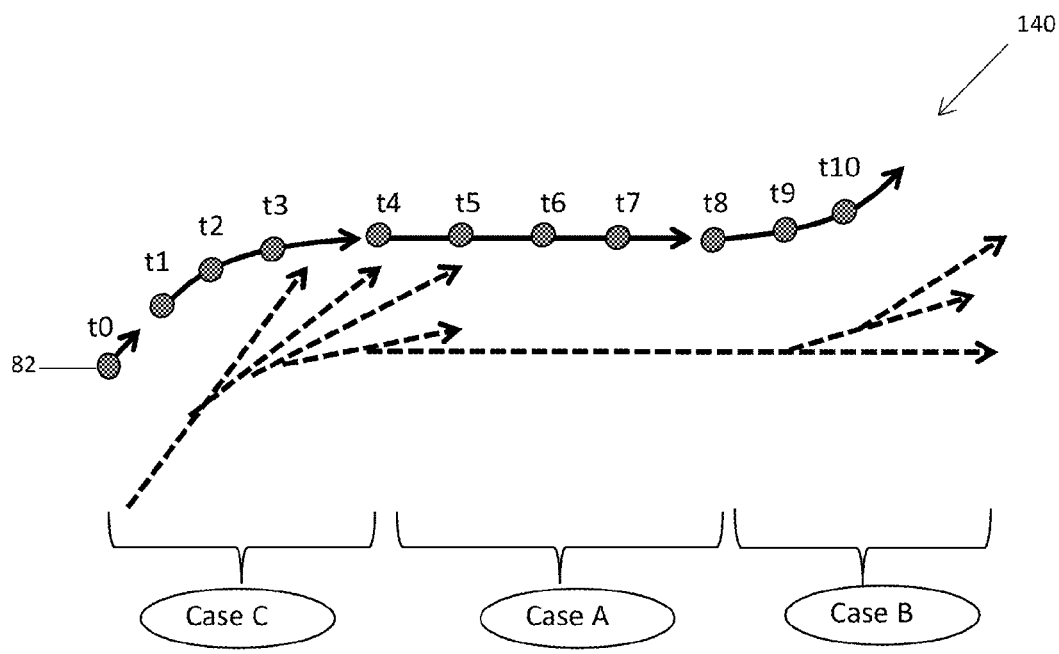
FIG. 8b is an example illustration of a second scenario of a mobile device travelling along a path segment with real positions and two combined categories of potential rendering errors from increasing and decreasing heading changes.

The path segment for example scenario two is generally indicated at 140 in FIG. 8b. This example path segment begins with Case C, an area of mobile device-remote observation misalignment risk followed by a transition to Case A and a final transition to Case B. Case C occurs primarily due to a increasing heading of the mobile device 11.

Figure 8C:
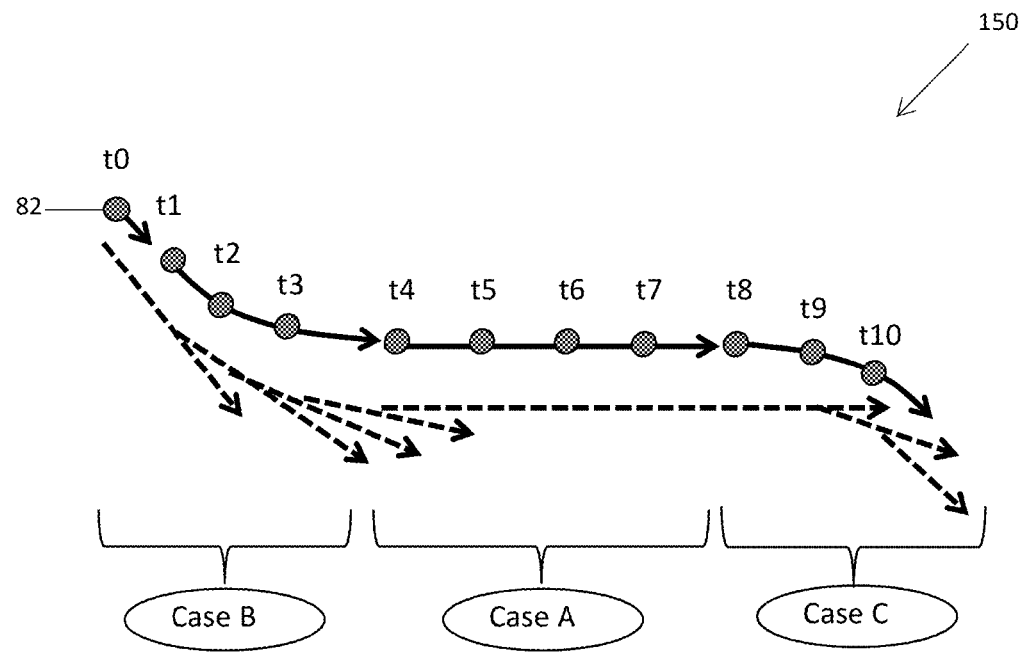
FIG. 8c is an example illustration of a third scenario of a mobile device travelling along a path segment with real positions and two combined categories of potential rendering errors from decreasing and increasing heading changes.
Figure 8D:
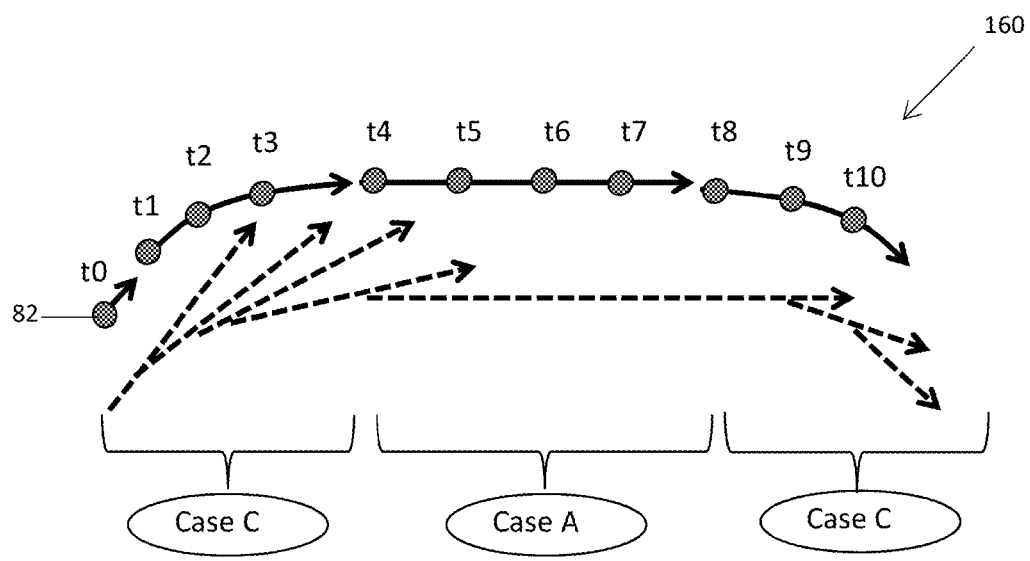
FIG. 8d is an example illustration of a fourth scenario of a mobile device travelling along a path segment with real positions and a category of potential rendering error from increasing heading changes.
Figure 8E:
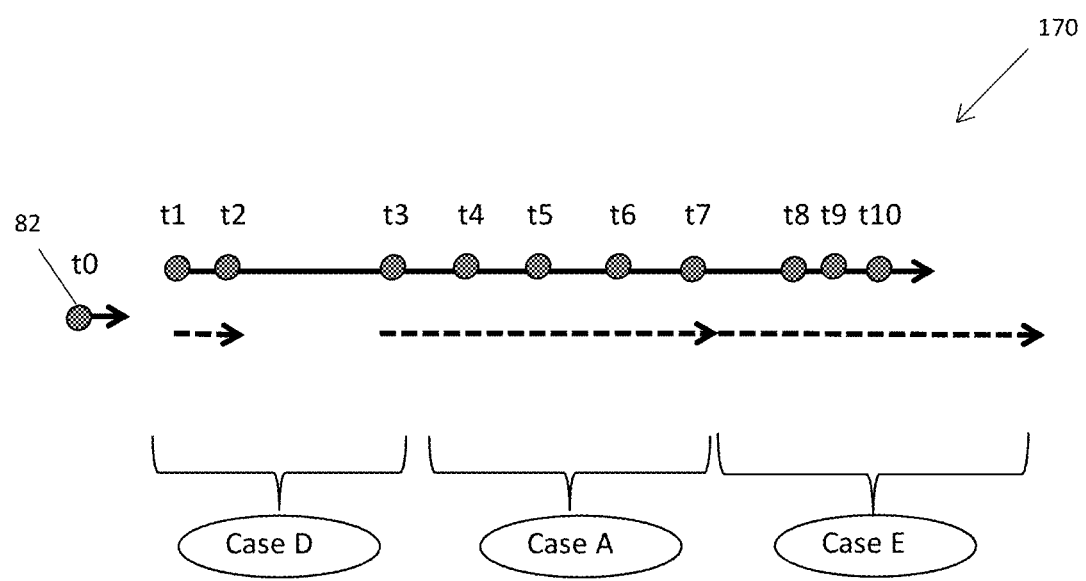
FIG. 8e is an example illustration of a fifth scenario of a mobile device travelling along a path segment with real positions and two combined categories of potential rendering errors with increasing and decreasing speed changes.

The path segment for example scenario four is generally indicated at 160 in FIG. 8d. This example path segment begins with Case C followed by a transition to Case A and a final transition to Case C.

The path segment for example scenario five is generally indicated at 170 in FIG. 8C. This example path segment begins with Case D followed by a transition to Case A and a final transition to Case E. Case D is a situation of mobile device-remote observation misalignment risk and occurs primarily due to an increasing speed of the mobile device 11. Case E is also a situation of mobile device-remote observation misalignment risk primarily due to the decreasing speed of the mobile device.

In summary, a path segment for a mobile device 11 may be represented by a combination of one or more of the categories (Case A for mobile device-remote observation alignment, and Case B, C, D, and E for mobile device-remote observation misalignment risk and the associated transitions between the categories.

Figure 9A:
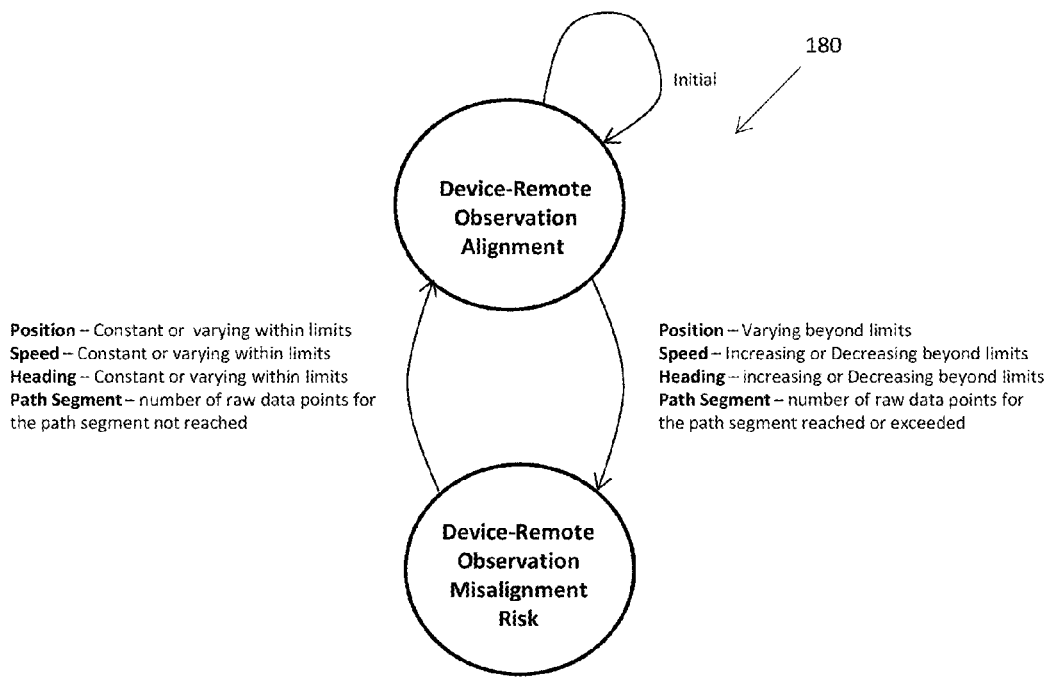
FIG. 9a is a state machine diagram of the furtherance visualization states and transition conditions.

Furtherance Visualization States and Mobile Device-Remote Observation Alignment and Misalignment Transitions The category for mobile device-remote observation alignment (Case A), relatively linear path segments, the four categories for misalignment (Case B, C, D, and E) and relatively non-linear path segments may be further associated as transitions between two furtherance visualization states. This is generally illustrated at 180 in FIG. 9a.

The two furtherance visualization states include a mobile device-remote observation alignment state and a mobile device-remote observation misalignment risk state. The initial state is the mobile device-remote observation alignment state. The initial state occurs for example when a mobile device 11 is stationary.

A state change may occur from mobile device-remote observation alignment to mobile device-remote observation misalignment based upon the operation of the mobile device 11 over time and upon the path segment. Cases B, C, D, and E over time cause a transition from the mobile device-remote observation alignment state to the mobile device-remote observation misalignment state. This can occur when a position is varying beyond limits, or the speed is increasing or decreasing beyond limits, or the heading is increasing or decreasing beyond limits. This may also occur with combinations of speed and heading changes. A relatively straight path segment and delay in a subsequent log of data over time can also cause a transition to the mobile device-remote observation misalignment state.

The state can also change from mobile device-remote observation misalignment back to mobile device-remote observation alignment based upon the operation of the mobile device 11 and upon the path segment. Case A or a relatively curved path segment and subsequent log of data can cause over time a transition from the mobile device-remote observation misalignment state to the mobile device-remote observation alignment state. This situation can also occur when a position, speed and heading become relatively constant or varying within limits.

Logging and Transmission of Mobile Device Vector Data

Figure 9B:
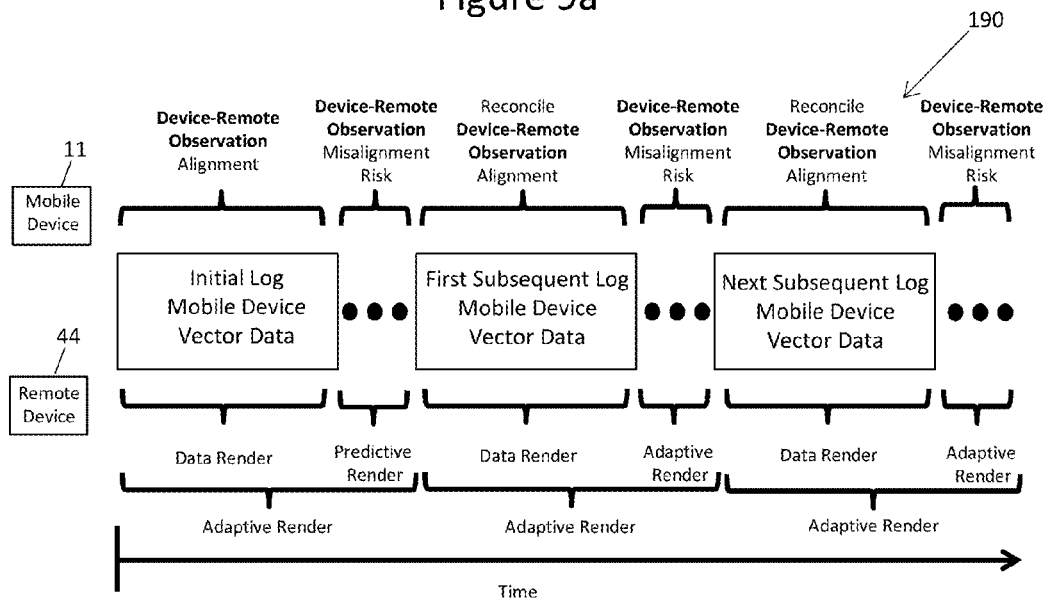
FIG. 9b is an example illustration of an initial log and subsequent logs of mobile device vector data over time with mobile device-remote observation alignment, mobile device-remote observation misalignment risk, reconciled alignment and adaptive rendering based upon past known positions provided by mobile device vector data.

Logging and transmission of mobile device vector data is based upon the furtherance visualization states of mobile device-remote observation alignment and mobile device-remote observation misalignment risk and the transition conditions. Logging and transmission is next described with respect to an initial log, subsequent logs, a potential for a mobile device-remote observation misalignment risk, a reconcile for mobile device-remote observation alignment and an adaptive rendering. This is generally indicated at 190 in FIG. 9b. In addition, four illustrative furtherance rendering examples are described and illustrated in FIGS. 10, 11a, 11b, 11c and 11d.

The mobile telemetry hardware system 30 creates multiple sequential logs of mobile device vector data. These sequential logs are communicated over time to a remote device 44 (see FIG. 9b) as generally indicated at 190.

Furtherance visualization and rendering of a graphical image 54 on a map 50 of a remote device 44 is in mobile device-remote observation alignment with the receipt of the initial log of mobile device vector data. The remote device 44 performs a data render of the graphical image 54 based upon the data points and associated time stamps found in the initial log of mobile device vector data. Rending each data point provides furtherance of the graphical image 54 on the map 50.

The log of mobile device vector data may be based upon different optimization processes. An optimization process can reduce the number of mobile device vector data points in the log. An optimization process can further limit the amount of data communication resulting in aperiodic delays in time concerning transmission and receipt of subsequent logs of mobile device vector data by the remote device 44. The optimization process can also provide a variable or different amount of data points and associated time stamps per log with relatively regular communication of the logs. The optimization process therefore creates the potential for a mobile device-remote observation misalignment risk.

Adaptive rendering provides an interconnection and transition between the initial log and subsequent logs of mobile device vector data. In an embodiment of the invention, adaptive rendering includes a phase shift between the mobile device time represented by the log of mobile device vector data and remote observation time represented by rendering the graphical image 54. Mobile device time is based upon GPS time related to the mobile device position in a time zone. Remote observation time is based upon any global time zone related to the remote system and observer. In another embodiment of the invention, adaptive rendering uses the data points from a log when the data is available as a data render. The amount of data points in each log may be different quantity causing a variable data render for each log. During periods of mobile device-remote observation misalignment risk and when the last data point in a log is reached before receipt of the next log of mobile device vector data, in another embodiment of the invention the adaptive rendering can switch to predictive rendering. In an embodiment of the invention, predictive rendering is based upon an extrapolation of the positions, heading and speed associated with the current log of mobile device vector data. A phase shift controls the amount of predictive render required before receipt of subsequent logs of mobile device vector data. Adaptive rendering continues with a data render upon receipt of the next subsequent log of mobile device vector data.

The mobile telemetry hardware system 30 can sense the risk of a mobile device-remote observation misalignment and send a subsequent log of mobile device vector data to reconcile the mobile device-remote observation misalignment with the remote device 44. The remote device 44 receives a subsequent log of mobile device vector data and continues the adaptive rendering based upon the subsequent log of mobile device vector data. This process continues through each subsequent receipt a log of mobile device vector data. Adaptive rendering and the reconcile and calibration of mobile device-remote observation alignment is achieved by a coupling of two distributed processes, one located with the mobile telemetry hardware system 30 and the other located with the remote device 44. The coupling links the logic to sense a misalignment risk and reconcile of the mobile device-remote observation misalignment with the logic to provide a phase shift for the adaptive render.

Figure 10:
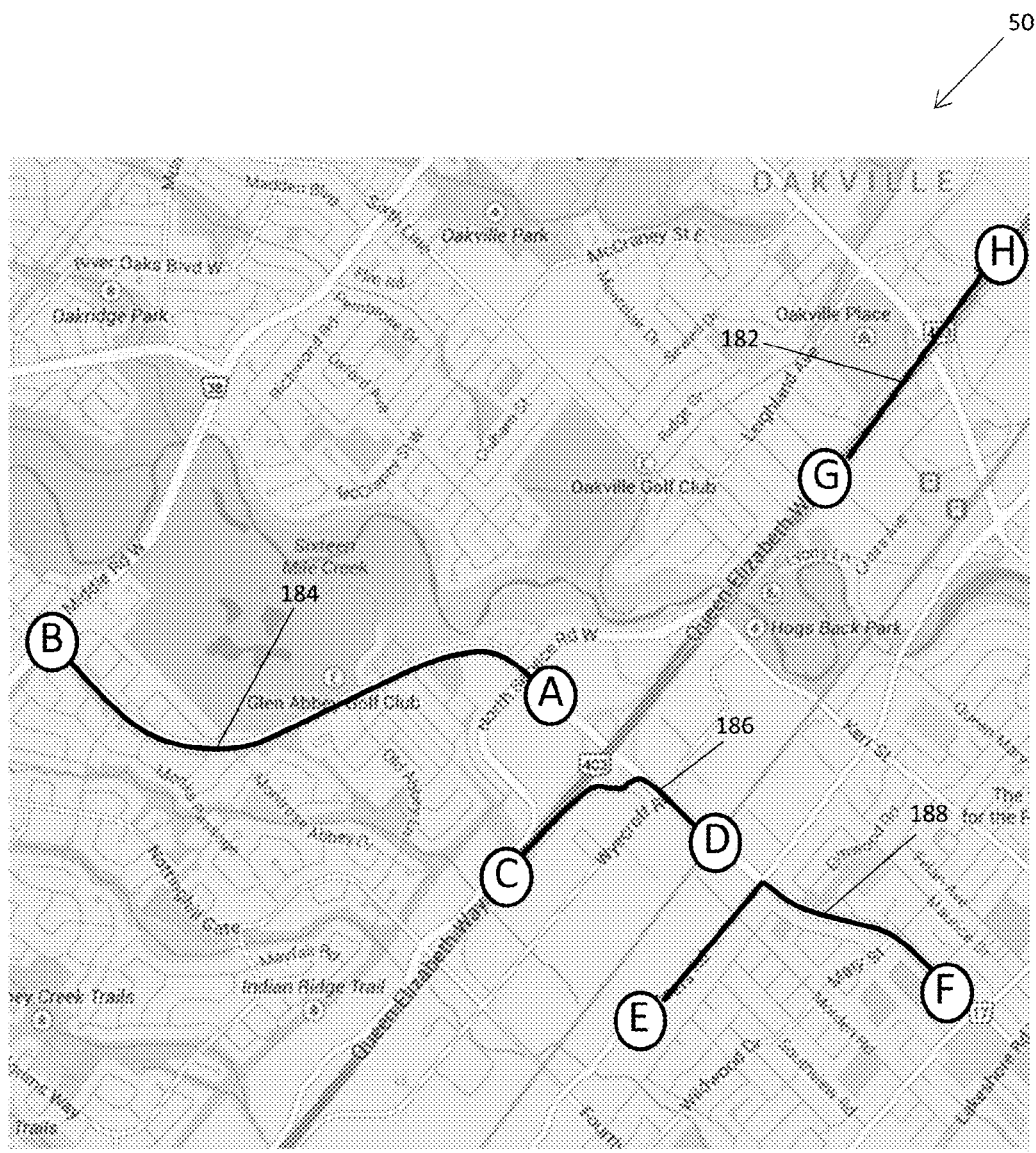
FIG. 10 is an example illustration of four different furtherance visualization renderings of a mobile device on a graphical image for a first path segment from point A to point B, a second path segment from point C to point D, a third path segment from point E to point F and a fourth path segment from point G to point H without rendering positional errors.
Figure 11A:
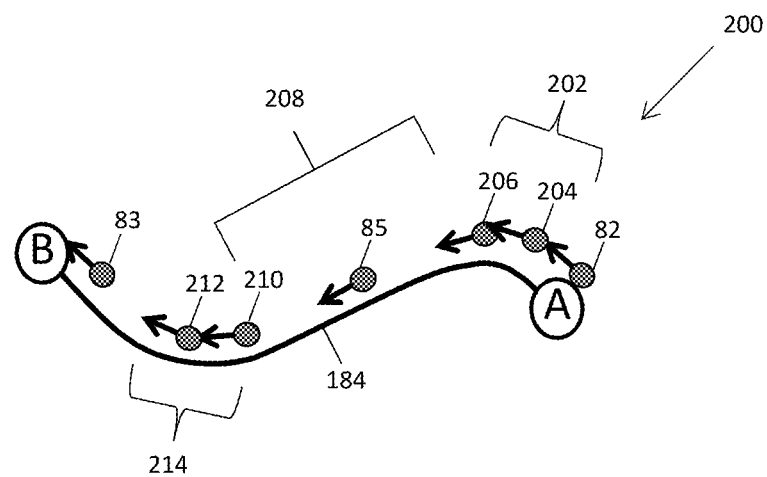
FIG. 11a is an example illustration of furtherance visualization for a first path segment from point A to point B, including multiple logs of mobile device vector data based upon mobile device-remote observation alignment and potential mobile device-remote observation misalignment risk.

The first example relates to a journey event 200 with a mobile device travelling a segment of a path 184 from a starting point A to a destination point B with a mix of linear path segments and curvilinear path segments as illustrated on the map 50 in FIGS. 10 and 11*a*. In an embodiment of the invention, a journey event 200 is a predetermined portion or segment of a longer or complete journey traveled by the mobile device 11. In an alternative embodiment of the invention for a short journey, a journey event 200 is the complete journey traveled by the mobile device 11.

The mobile device 11 begins a journey event at point A on the path 184. An initial log of mobile device vector data 82 is transmitted from the mobile telemetry hardware system 30 to a remote system 44. The log may include one or more data points of mobile device vector data 82. The mobile device 11 then enters into a first segment of mobile device-remote observation misalignment risk 202. The mobile telemetry hardware system 30 can sense and determine a mobile device-remote observation misalignment risk. A series of mobile device vector data (204, 206) are logged and transmitted from the mobile device telemetry hardware system 30 to a remote system 44 to reconcile the mobile device-remote observation misalignment risk. In an embodiment of the invention, the series of mobile device vector data (204, 206) may be transmitted relatively more frequently in time when in the first segment of mobile device-remote observation misalignment risk 202 as compared to a segment of mobile device-remote observation alignment. In another embodiment of the invention, the log may contain a larger sample (higher amount) of mobile device vector data points.

Next, the mobile device 11 enters into a segment of mobile device-remote observation alignment 208 where the mobile telemetry hardware system 30 senses mobile device-remote observation alignment. Another log of mobile device vector data 85 is created and transmitted from the mobile telemetry hardware system 30 to a remote system 44. In an embodiment of the invention, the transmission may be relatively less frequent in time when compared to the segment of mobile device-remote observation misalignment risk (202, 214). In another embodiment of the invention, the log may contain a smaller sample of mobile device vector data points.

Next, the mobile device 11 enters into another segment of mobile device-remote observation misalignment risk 214. The mobile telemetry hardware system 30 again senses and determines a mobile device-remote observation misalignment risk and another series of mobile device vector data (210, 212) are logged and transmitted from the mobile device telemetry hardware system 30 to a remote system 44 relatively more frequently in time or with relatively more data points in the log. In an embodiment of the invention, the log may contain a larger sample of mobile device vector data points and associated time stamps.

Then the mobile device 11 enters into another segment of mobile device-remote observation alignment and completes the journey at point B. Another log of mobile device vector data 83 is created and transmitted from the mobile telemetry hardware system 30 to a remote system 44.

Figure 11B:
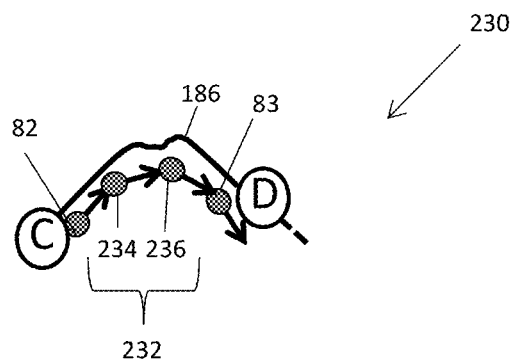
FIG. 11b is an example illustration of furtherance visualization rendering a mobile device on a second path segment from point C to point D, including multiple logs of mobile device vector data based upon mobile device-remote observation alignment and potential mobile device-remote observation misalignment risk.

The second example relates to an exit event 230 where the mobile device 11 is travelling a path 186 from point C to point D. The exit event 230 is a sub-event of a journey event. The exit event occurs where the mobile device 11 exits a highway and makes a heading change onto another path segment. The mobile telemetry hardware system 30 senses the exit event 230 in contrast to a lane change at point C. The path segment includes a mix of linear and curvilinear segments as illustrated in FIG. 11*b* until the exit event 230 completes at point D.

During the exit event 230, the mobile telemetry hardware system 30 senses a segment of mobile device-remote observation misalignment risk 222. In an embodiment of the invention, a series of mobile device vector data (224,226) are logged and may be transmitted from the mobile device telemetry hardware system 30 to a remote device 44 more frequently in time to reconcile the mobile device-remote observation misalignment. In another embodiment of the invention, the log contains a larger sample of mobile device vector data points communicated less frequently in time. Again, upon receipt of the log of mobile device vector data, the remote device 44 renders the data adaptively to provide a graphical image 54 on a map 50 of the remote device 44.

Figure 11C:
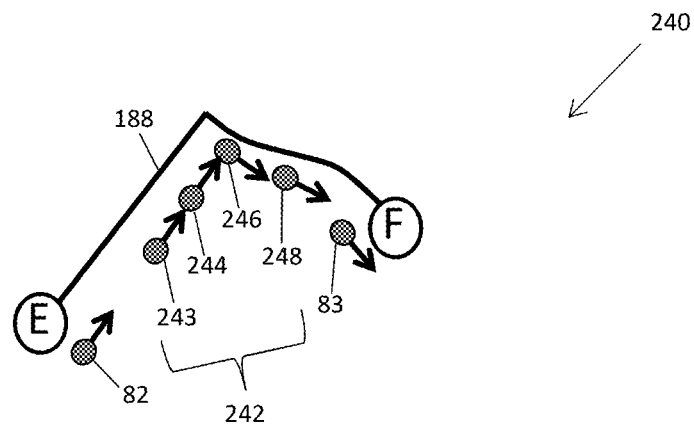
FIG. 11c is an example illustration of furtherance visualization rendering a mobile device on a third path segment from point E to point F, including multiple logs of mobile device vector data based upon mobile device-remote observation alignment and potential mobile device-remote observation misalignment risk.

The third example relates to an intersection event 240 as illustrated by a mobile device travelling a path 188 from point E to point F. The intersection event is also a sub-event of a journey event 200. The intersection event example occurs when the mobile device arrives at an intersection and makes a heading change at the intersection. The path includes a mix of linear and curvilinear segments as illustrated in FIG. 11*c*.

Before entering the intersection event 240, the mobile device 11 is in a segment of mobile device-remote observation alignment at point E with a corresponding log of mobile device vector data 82 and transmission to a remote system 44.

During the intersection event 240, the mobile telemetry hardware system 30 can sense a segment of mobile device-remote observation misalignment risk 232. A series of mobile device vector data (234, 236, 238, 242) are logged and may be transmitted from the mobile device telemetry hardware system 30 to a remote system 44 relatively more frequently in time. In another embodiment of the invention, the log contains a larger sample of mobile device vector data points communicated less frequently in time. Then, the mobile device 11 enters into a segment of mobile device-remote observation alignment at point F. Another log of mobile device vector data 83 is created and transmitted from the mobile telemetry hardware system 30 to a remote system 44. Again, upon receipt of the log of mobile device vector data, the remote device 44 renders the data adaptively to provide a graphical image 54 on a map 50 of the remote device 44.

Figure 11D:
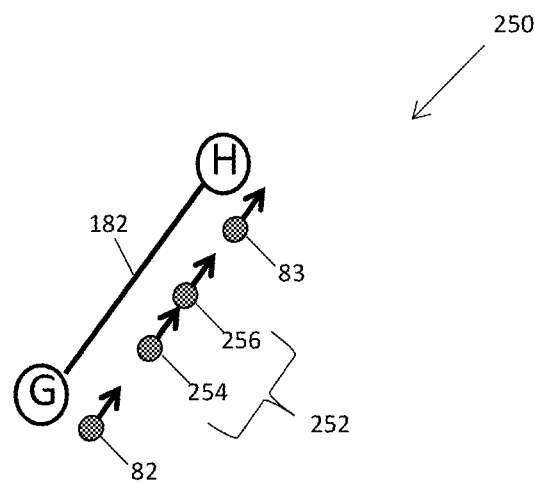
FIG. 11d is an example illustration of furtherance visualization rendering a mobile device on a fourth path segment from point G to point H, including multiple logs of mobile device vector data based upon mobile device-remote observation alignment and potential mobile device-remote observation misalignment risk.

The fourth example relates to a mobile device travelling a path 182 from point G to point H where a speed event 250 occurs. The speed event 250 may be a sub event of a journey event 200 or an exit event 230 or an intersection event 240. Here, the path is a linear segment as illustrated in FIG. 11*d* but alternatively the path segment could be curvilinear or a combination of linear and curvilinear.

Before entering the speed event 250, the mobile device 11 is in a segment of mobile device-remote observation alignment at point G with a corresponding log of mobile device vector data 82 and transmission to a remote device 44.

During the speed event 250, the mobile telemetry hardware system 30 senses a segment of mobile device-remote observation misalignment risk 220. A series of mobile device vector data (222, 224) are logged and can be transmitted from the mobile device telemetry hardware system 30 to a remote device 44 more frequently in time. In an embodiment of the invention, the log contains a larger sample of mobile device vector data points communicated less frequently in time. Then the mobile device 11 enters into a segment of mobile device-remote observation alignment at point H and another log of mobile device vector data 83 is created and transmitted from the mobile telemetry hardware system 30 to a remote device 44. Upon receipt of the log of mobile device vector data, the remote device 44 renders the data adaptively to provide a graphical image 54 on a map 50 of the remote device 44.

Sensing mobile device-remote observation misalignment risk can occur in a number of different ways. In an embodiment of the invention, sensing occurs when a heading changes beyond a defined limit triggering the reconcile of mobile device-remote observation alignment. In another embodiment of the invention, sensing occurs when a speed changes beyond a defined limit triggering the reconcile of mobile device-remote observation alignment. In another embodiment of the invention, sensing occurs when a number of raw data points have been sampled triggering a reconcile of mobile device-remote observation alignment.

Figure 12A:
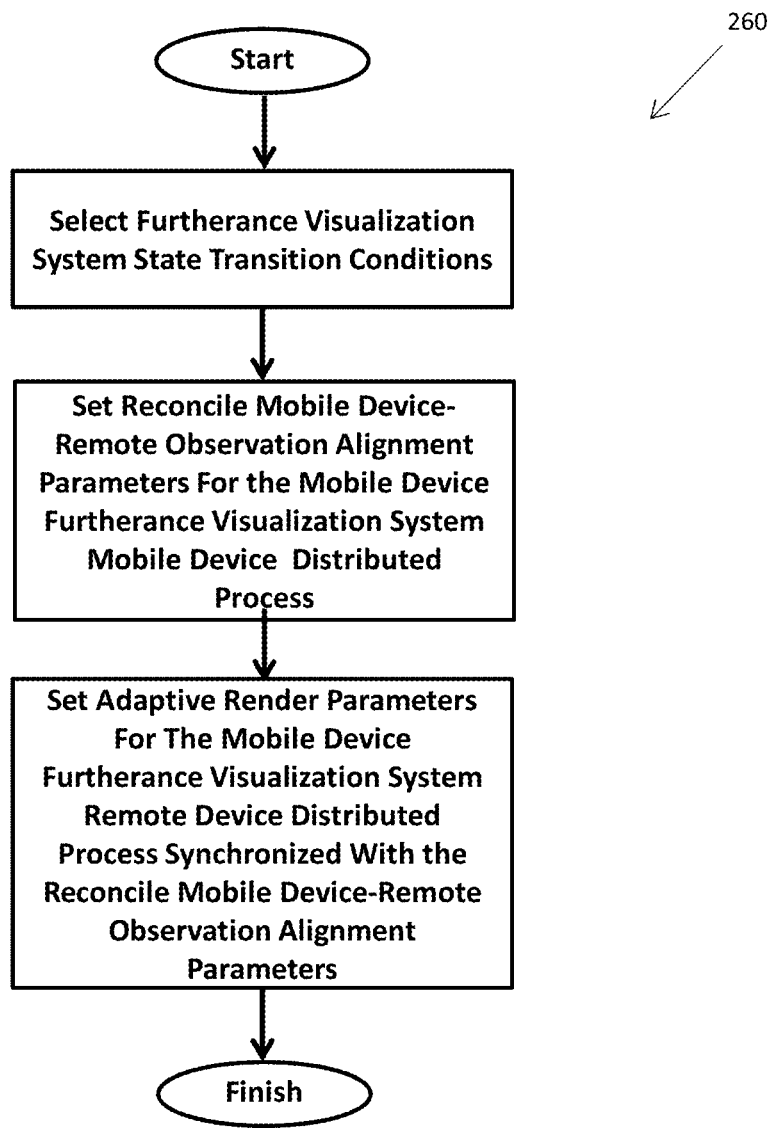
FIG. 12a is a flow chart illustrating the logic of a telematics furtherance visualization system process for calibration between the mobile device and the remote device.
Figure 12B:
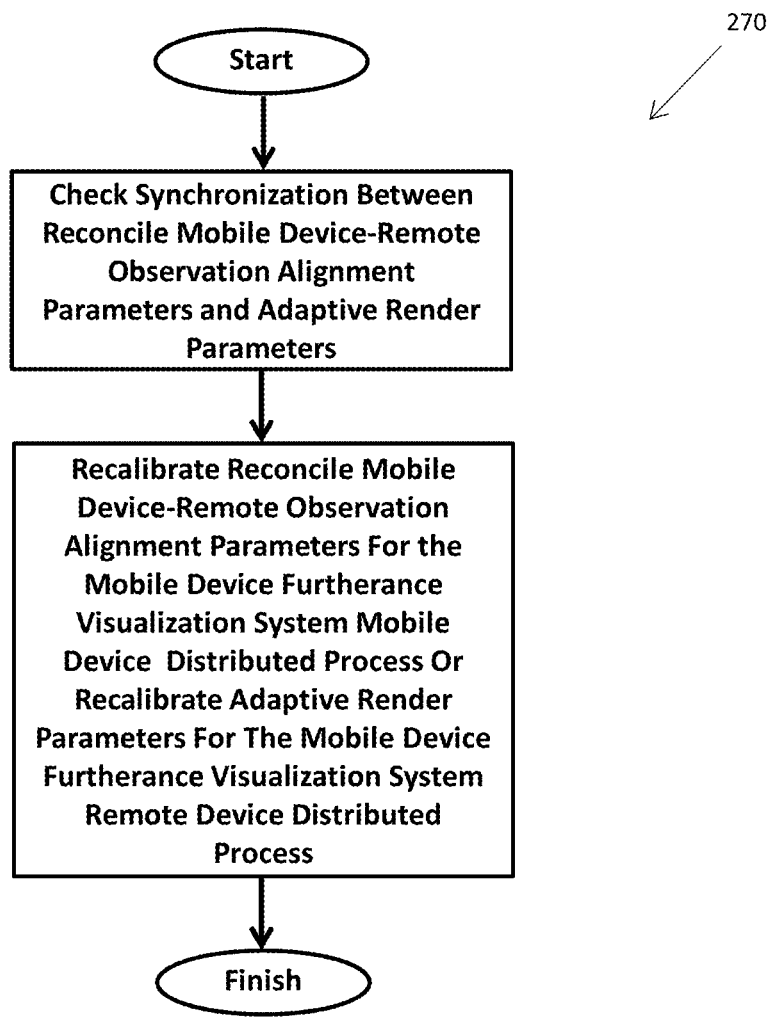
FIG. 12b is a flow chart illustrating the logic of a telematics furtherance visualization system process for recalibration between the mobile device and the remote device.

Mobile Device Furtherance Visualization System Process Calibration and Recalibration Calibration and recalibration of the mobile device furtherance visualization system process is next described with reference to FIGS. 12*a* and 12*b*.

Calibration begins by selecting the furtherance visualization system state transition conditions. The conditions may be based on one or more of the position, speed, heading or portion of a longer path segment (complete journey) represented by a number of raw data points of mobile device vector data. Then, based upon the selected state transition conditions, the reconcile mobile device-remote observation alignment parameters are set for the furtherance visualization system mobile device distributed process. Adaptive render parameters are also based upon the selected transition conditions and correlated to the reconcile mobile device-remote observation alignment parameters are set for the furtherance visualization system remote device distributed process. The correlation provides an appropriate relative mobile device-remote observation timing and phase shift between the furtherance visualization system mobile device distributed process and the remote device distributed process.

The furtherance visualization system process may also be recalibrated to further refine or adjust the appropriate relative timing and phase shift. Recalibration begins with a check of the phase shift between the reconcile mobile device-remote observation alignment parameters and the adaptive render parameters. The check determines if the amount of predictive render is acceptable between the receipts of subsequent logs of mobile device vector data. Predictive render is acceptable when the predictive render does not introduce any rendering errors on the map 50 of a graphical display. If the appropriate timing and phase shift is not acceptable, then recalibrate the reconcile mobile device-remote observation alignment parameters for the furtherance visualization system mobile device distributed process or recalibrate the adaptive render parameters for the mobile device furtherance visualization system remote device distributed process.

For example, in an embodiment of the invention the number of data points in a log of mobile device vector data are reduced by a path simplification process. A log of mobile device vector data is communicated periodically to the remote device. Persons skilled in the art will appreciate there are a number of approaches to reduce the data points representative of a path segment such as the Ramer Douglas Peucker approach, Douglas Peucker approach, iterative end point fit approaches, polyline reductions and split and merge approaches. For this embodiment, the furtherance visualization system state transition conditions are based upon a portion of a path segment and number of raw data points and associated time stamps. The reconcile mobile device-remote observation alignment parameters are then set to a sample of 100 raw data points to define the portion of a path segment traveled by the mobile device 11 over time for this example embodiment. Sampling of the 100 raw data points is one sample per second. The adaptive render parameters and then set to a range between −4.5 seconds and −13.5 seconds. The adaptive render parameters provide for a phase shift between the distributed processes. Recalibration of the furtherance visualization system process of this embodiment may result in a different set or refinement of the parameters. For example, the adaptive render parameters may be set more precisely to 9.0 seconds to provide better calibration. Alternatively, the sample of 100 raw data points to define the portion of the path segment could be reduced to a smaller sample less than 100 for the reconcile mobile device-remote observation alignment parameters or a larger sample greater than 100 as long as the parameters are calibrated and correlated within the system process.

In another embodiment of the invention, the communication and frequency of logs of mobile device vector data are reduced and based upon events such as the speed and the heading of the mobile device 11. For a relatively constant speed and heading, the logs are not communicated to the remote device 44. When speed or heading changes beyond a limit, then the log of mobile device vector data is communicated aperiodically to the remote device. The reconcile mobile device-remote observation alignment parameters are set to a speed or heading limit. These limits initiate a reconcile of mobile device-remote observation alignment and communication of a subsequent log of mobile device vector data to a remote device. The adaptive render parameters are then set to a range of time to provide the phase shift between the distributed processes. Recalibration of the furtherance visualization system process for this embodiment may result in a different set of parameters. For example, the adaptive render parameters may be set to more narrow range or precise number in seconds for the phase shift. Alternatively, the speed change limit may be adjusted, or the heading change limit may be adjusted. The recalibration may also be a combination of adjusted or different parameters for both the reconcile mobile device-remote observation alignment or adaptive render parameters.

Mobile Device Furtherance Visualization System Mobile Distributed Logic

The first distributed process and furtherance visualization logic and determination of alignment or misalignment risk are next described with reference to FIGS. 13*a* and 13*b*. The mobile device logic is generally illustrated at 280 and the check reconcile mobile device-remote observation alignment parameter logic is generally indicated at 290.

The mobile device furtherance visualization system distributed process is initially calibrated with furtherance visualization reconcile mobile device-remote observation alignment parameters. The furtherance visualization reconcile mobile device-remote observation alignment parameters may also be recalibrated during operation of the process. An initial log of mobile device vector data is communicated from the mobile telemetry hardware system 30 to a remote device 44. Then, the mobile device 11 is monitored and another subsequent log of mobile device vector data is generated and stored in memory of the mobile telemetry hardware system 30. The microprocessor 31 and firmware executing the mobile device furtherance visualization logic is capable to check the reconcile mobile device-remote observation alignment parameters. If the alignment is in mobile device-remote observation alignment, continue to monitor the mobile device and log mobile device vector data. If the alignment is in mobile device-remote observation misalignment risk, then enable a reconciliation for a mobile device-remote observation misalignment risk and communicate the subsequent log of mobile device vector data to a remote system 44. The logic continues and returns to monitor the mobile device 11 and log mobile device vector data.

The check for reconcile mobile device-remote observation alignment begins with a determination of the mobile device position. If the position is varying beyond limits, then set mobile device-remote observation misalignment risk. If the position is relatively constant or varying within limits, check the mobile device speed. If the speed is increasing or decreasing beyond limits, set mobile device-remote observation misalignment risk. If the speed is relatively constant or varying within limits, check the mobile device heading. If the heading is increasing or decreasing beyond limits, set mobile device-remote observation misalignment risk. If the heading is relatively constant or varying within limits, set mobile device-remote observation alignment. If the path segment has reached (equal or greater than) the maximum number of raw data points (example of 100 raw data points), then set mobile device-remote observation misalignment risk. If the path segment has not reached (less than) the maximum number of raw data points (example 100 raw data points), then set mobile device-remote observation alignment.

In an embodiment of the invention, the mobile device parameters of position, speed and heading may be checked in any logical order of position, speed, heading or path segment. In another embodiment of the invention, the check may be one or more of the reconcile mobile device-remote observation alignment parameters (position, or speed, or heading, or path segment) to determine a mobile device-remote observation misalignment risk. Optionally, the mobile device may also communicate a heartbeat message to a remote device. The heartbeat message signals normal operation and alignment of the mobile device to the remote device during longer periods of time between subsequent logs of mobile device vector data.

The mobile telemetry hardware system 30 including the DTE telemetry microprocessor 31, non-volatile flash memory 35 and firmware execute the logic of the first distributed process. In embodiments of the invention, the GPS module 33, either integral with the mobile telemetry hardware system 30 or external to the mobile telemetry hardware system 30 provide mobile device vector data. Alternatively, mobile device vector data may be provided over the vehicle network communications bus 37 to the interface 36 to the DTE telemetry microprocessor 31 and non-volatile flash memory 35. The DCE wireless telemetry communications microprocessor 32 integral with the mobile telemetry hardware system 30 or alternatively an external DCE wireless telemetry communications microprocessor 32 provides the capability to communicate mobile device vector data.

Remote Device Furtherance Visualization System Distributed Logic

Figure 14:
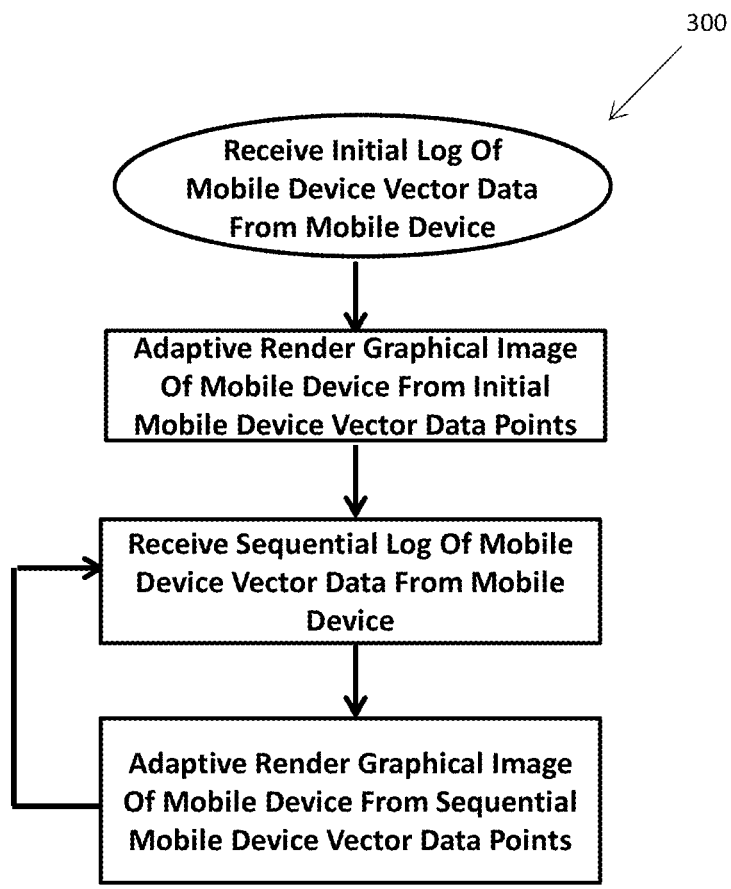
FIG. 14 is a flow chart illustrating the logic of a telematics furtherance visualization system remote device distributed process.

The second distributed process and furtherance visualization system logic is next described with reference to FIG. 14. The remote device furtherance visualization system distributed process is initially calibrated with adaptive render parameters for a phase shift. The adaptive render parameters may also be recalibrated during operation of the process.

The initial log of mobile device vector data is received from the mobile telemetry hardware system 30. A mobile device 11 is adaptive rendered on a graphical display based upon the sequence of data points and associated time stamps contained in the initial log of mobile device vector data. Then, the remote device 44 receives a subsequent log of mobile device vector data. The mobile device 11 is adaptive rendered on a graphical display based upon the sequence of data points contained in the subsequent log of mobile device vector data and the phase shift. The process repeats for each receipt of subsequent logs of mobile device vector data.

In an embodiment of the invention, the adaptive render is a phase shift. In another embodiment of the invention, the adaptive render includes a data render. In another embodiment of the invention, the adaptive render includes a predictive render. The phase shift is calibrated to reduce the amount of predictive render or to limit the amount of mobile device-remote observation misalignment risk.

A microprocessor and memory on the server 19, or the computing device 20 execute the logic of the second distributed process. The second distributed process may also be incorporated into a fleet management software program 10 that executes on a server 19 or a computing device 20.

Embodiments of the present invention provide one or more technical effects. More specifically, an ability to maintain a mobile device-remote observation alignment between a mobile device and a remote device for receiving logs of mobile device vector data and rendering a graphical image of the mobile device on a graphics display. Another ability to sense a mobile device-remote observation misalignment risk between the mobile device and the remote device and communication of a log of mobile device vector data to reconcile mobile device-remote observation alignment. An adaptive render with a calibrated phase shift including the ability to render based upon data from the log of mobile device vector data and the ability to render predictively when required until receipt of a subsequent log of mobile device vector data. Another ability to calibrate the adaptive render with the reconcile mobile device-remote observation alignment to minimize the predictive render when required.

The description of present invention is with respect to the disclosed non-limiting embodiments and persons skilled in the art understand that the invention is not limited to the disclosed non-limiting embodiments. Persons skilled in the art further understand that the disclosed invention intends to cover various modifications and equivalent arrangements included within the scope of the appended claims. Thus, the present invention is not limited by any of the described non-limiting embodiments.

What is claimed is:

1. A telematics furtherance visualization method comprising:
   a first distributed process for a mobile device,
   a second distributed process for a remote device, said first distributed process and said second distributed process capable of communicating messages and data,
   said first distributed process capable to monitor said mobile device to log and communicate mobile device vector data to said remote device, said first distributed process capable to sense a mobile device remote observation misalignment risk and reconcile mobile device remote observation alignment, and said second distributed process capable to adaptive render a graphical image of said mobile device from said mobile device vector data, said mobile device remote observation misalignment risk includes mobile device remote observation alignment parameters, said adaptive render includes adaptive render parameters, said mobile device remote observation alignment parameters and said adaptive render parameters are correlated, said reconcile mobile device remote observation alignment includes communicating a subsequent log of said mobile device vector data, said capable to sense a potential mobile device remote observation misalignment risk is based upon checking said mobile device remote observation alignment parameters, wherein said checking said mobile device remote observation alignment parameters determines a mobile device remote observation misalignment risk based upon at least one of a position varying beyond a limit, a speed limit, a heading limit or a number of raw data points.

2. A telematics furtherance visualization method as in claim 1 wherein said mobile device vector data comprises at least one data point of a position indication, a speed indication or a heading indication of said mobile device and at least one time stamp associated with each said data point.

3. A telematics furtherance visualization method as in claim 1 wherein said mobile device remote observation alignment parameters are based upon at least one of a position limit, a speed limit, a heading limit or a path segment limit.

4. A telematics furtherance visualization method as in claim 1 wherein said adaptive render parameters are based upon at least one of a phase shift, a data render, or a predictive render.

5. A telematics furtherance visualization method as in claim 1 wherein said mobile device remote observation alignment parameters are based upon a combination of at least two of a position limit, a speed limit, a heading limit, or a path segment limit.

6. A telematics furtherance visualization method as in claim 1 wherein said adaptive render parameters are based upon a combination of at least two of a phase shift, a data render, or a predictive render.

7. A telematics furtherance visualization method as in claim 1 wherein said mobile device remote observation alignment parameters and said adaptive render parameters are correlated to command a predictive render.

8. A telematics furtherance visualization apparatus as in claim 7 further including a heartbeat to further command a predictive render.

9. A telematics furtherance visualization method as in claim 1 wherein said mobile device remote observation alignment parameters and said adaptive render parameters are calibrated to command a predictive render.

10. A telematics furtherance visualization apparatus as in claim 9 further including a heartbeat to further command a predictive render.

11. A telematics furtherance visualization method as in claim 1 wherein said checking said mobile device remote observation alignment parameters enables said reconcile mobile device remote observation alignment.

12. A telematics furtherance visualization method as in claim 1 wherein said capable to adaptive render is based upon said adaptive render parameters.

13. A telematics furtherance visualization method as in claim 1 wherein said mobile device remote observation alignment parameters and said adaptive render parameters may be recalibrated.

14. A telematics furtherance visualization method as in claim 1 wherein said recalibrated is at least one of said mobile device remote observation alignment parameters or said adaptive render parameters.

15. A telematics furtherance visualization method as in claim 1 further including a heartbeat to further command a predictive render.

16. A telematics mobile device visualization apparatus comprising:

at least one mobile device, said at least one mobile device including a microprocessor, memory and firmware, said microprocessor, memory and firmware capable of executing a first distributed process, at least one remote device, said at least one remote device including a microprocessor, memory and software, said microprocessor, memory and software capable of executing a second distributed process, said at least one mobile device and said at least one remote device capable of communication, a first distributed process for a mobile device, a second distributed process for a remote device, said first distributed process and said second distributed process capable of communicating messages and data, said first distributed process capable to monitor said mobile device to log and communicate mobile device vector data to said remote device, said first distributed process capable to sense a mobile device remote observation misalignment risk and reconcile mobile device remote observation alignment, said second distributed process capable to adaptive render a graphical image of said mobile device from said mobile device vector data, said mobile device remote observation misalignment risk includes mobile device remote observation alignment parameters, said adaptive render includes adaptive render parameters, said mobile device remote observation alignment parameters and said adaptive render parameters are correlated said reconcile mobile device remote observation alignment includes communicating a subsequent log of said mobile device vector data, said capable to sense a potential mobile device remote observation misalignment risk is based upon checking said mobile device remote observation alignment parameters, and wherein said checking said mobile device remote observation alignment parameters determines a mobile device remote observation misalignment risk based upon at least one of a position varying beyond a limit, a speed limit, a heading limit or a number of raw data points.

17. A telematics furtherance visualization apparatus as in claim 16 wherein said mobile device vector data comprises at least one data point of a position indication, a speed indication or a heading indication of said mobile device and at least one time stamp associated with each said data point.

18. A telematics furtherance visualization apparatus as in claim 16 wherein said mobile device remote observation alignment parameters are based upon at least one of a position limit, a speed limit, a heading limit or a path segment limit.

19. A telematics furtherance visualization apparatus as in claim 16 wherein said adaptive render parameters are based upon at least one of a phase shift, a data render, or a predictive render.

20. A telematics furtherance visualization apparatus as in claim 16 wherein said mobile device remote observation alignment parameters are based upon a combination of at least two of a position limit, a speed limit, a heading limit, or a path segment limit.

21. A telematics furtherance visualization apparatus as in claim 16 wherein said adaptive render parameters are based upon a combination of at least two of a phase shift, a data render, or a predictive render.

22. A telematics furtherance visualization apparatus as in claim 16 wherein said mobile device remote observation alignment parameters and said adaptive render parameters are correlated to command a predictive render.

23. A telematics furtherance visualization apparatus as in claim 22 further including a heartbeat to further command a predictive render.

24. A telematics furtherance visualization apparatus as in claim 16 wherein said mobile device remote observation alignment parameters and said adaptive render parameters are calibrated to command a predictive render.

25. A telematics furtherance visualization apparatus as in claim 24 further including a heartbeat to further command a predictive render.

26. A telematics furtherance visualization apparatus as in claim 16 wherein said checking said mobile device remote observation alignment parameters enables said reconcile mobile device remote observation alignment.

27. A telematics furtherance visualization apparatus as in claim 16 wherein said capable to adaptive render is based upon said adaptive render parameters.

28. A telematics furtherance visualization apparatus as in claim 16 wherein said mobile device remote observation alignment parameters and said adaptive render parameters may be recalibrated.

29. A telematics furtherance visualization apparatus as in claim 28 wherein said recalibrated is at least one of said mobile device remote observation alignment parameters or said adaptive render parameters.

30. A telematics furtherance visualization apparatus as in claim 16 further including a heartbeat to further command a predictive render.

31. A telematics furtherance visualization method comprising:
   a first distributed process for a mobile device,
   a second distributed process for a remote device, said first distributed process and said second distributed process capable of communicating messages and data,
   said first distributed process capable to monitor said mobile device to log and communicate mobile device vector data to said remote device, said first distributed process capable to sense a mobile device remote observation misalignment risk and reconcile mobile device remote observation alignment,
   said second distributed process capable to adaptive render a graphical image of said mobile device from said mobile device vector data,
   said mobile device remote observation misalignment risk includes mobile device remote observation alignment parameters,
   said adaptive render includes adaptive render parameters,
   said mobile device remote observation alignment parameters and said adaptive render parameters are correlated,
   said reconcile mobile device remote observation alignment includes communicating a subsequent log of said mobile device vector data,
   said mobile device remote observation alignment parameters are based upon at least one of a position limit, a speed limit, a heading limit or a path segment limit,
   said adaptive render parameters are based upon at least one of a phase shift, a data render, or a predictive render, and
   said path segment limit is 100 raw data points of mobile device vector data and said phase shift is in the range between −4.5 seconds and −13.5 seconds.

32. A telematics furtherance visualization method comprising:
   a first distributed process for a mobile device,
   a second distributed process for a remote device, said first distributed process and said second distributed process capable of communicating messages and data,
   said first distributed process capable to monitor said mobile device to log and communicate mobile device vector data to said remote device, said first distributed process capable to sense a mobile device remote observation misalignment risk and reconcile mobile device remote observation alignment,
   said second distributed process capable to adaptive render a graphical image of said mobile device from said mobile device vector data,
   said mobile device remote observation misalignment risk includes mobile device remote observation alignment parameters,
   said adaptive render includes adaptive render parameters,
   said mobile device remote observation alignment parameters and said adaptive render parameters are correlated,
   said reconcile mobile device remote observation alignment includes communicating a subsequent log of said mobile device vector data,
   said mobile device remote observation alignment parameters are based upon at least one of a position limit, a speed limit, a heading limit or a path segment limit,
   said adaptive render parameters are based upon at least one of a phase shift, a data render, or a predictive render, and said path segment limit is 100 raw data points of mobile device vector data and said phase shift is substantially −9 seconds.

33. A telematics mobile device visualization apparatus comprising:
   at least one mobile device,
   said at least one mobile device including a microprocessor, memory and firmware,
   said microprocessor, memory and firmware capable of executing a first distributed process,
   at least one remote device,
   said at least one remote device including a microprocessor, memory and software,
   said microprocessor, memory and software capable of executing a second distributed process,
   said at least one mobile device and said at least one remote device capable of communication,
   a first distributed process for a mobile device,
   a second distributed process for a remote device, said first distributed process and said second distributed process capable of communicating messages and data,
   said first distributed process capable to monitor said mobile device to log and communicate mobile device vector data to said remote device, said first distributed process capable to sense a mobile device remote observation misalignment risk and reconcile mobile device remote observation alignment, said second distributed process capable to adaptive render a graphical image of said mobile device from said mobile device vector data, said mobile device remote observation misalignment risk includes mobile device remote observation alignment parameters, said adaptive render includes adaptive render parameters, said mobile device remote observation alignment parameters and said adaptive render parameters are correlated, said reconcile mobile device remote observation alignment includes communicating a subsequent log of said mobile device vector data, said mobile device remote observation alignment parameters are based upon at least one of a position limit, a speed limit, a heading limit or a path segment limit, and wherein said adaptive render parameters are based upon at least one of a phase shift, a data render, or a predictive render.

34. A telematics mobile device visualization apparatus as in claim 33 wherein said path segment limit is 100 raw data points of mobile device vector data and wherein said phase shift is in the range between −4.5 second and −13.5 seconds.

35. A telematics furtherance visualization apparatus as in claim 33 wherein said path segment limit is 100 raw data points of mobile device vector data and wherein said phase shift is substantially −9 seconds.

36. A telematics furtherance visualization method comprising:

a first distributed process for a mobile device, a second distributed process for a remote device, said first distributed process and said second distributed process capable of communicating messages and data, said first distributed process capable to monitor said mobile device to log and communicate mobile device vector data to said remote device, said first distributed process capable to sense a mobile device remote observation misalignment risk and reconcile mobile device remote observation alignment, said second distributed process capable to adaptive render a graphical image of said mobile device from said mobile device vector data, said mobile device remote observation misalignment risk includes mobile device remote observation alignment parameters, said adaptive render includes adaptive render parameters, said mobile device remote observation alignment parameters and said adaptive render parameters are correlated, said reconcile mobile device remote observation alignment includes communicating a subsequent log of said mobile device vector data, said mobile device remote observation alignment parameters and said adaptive render parameters are correlated to command a predictive render, and a heartbeat to further command a predictive render.

37. A telematics furtherance visualization method comprising:

a first distributed process for a mobile device, a second distributed process for a remote device, said first distributed process and said second distributed process capable of communicating messages and data, said first distributed process capable to monitor said mobile device to log and communicate mobile device vector data to said remote device, said first distributed process capable to sense a mobile device remote observation misalignment risk and reconcile mobile device remote observation alignment, said second distributed process capable to adaptive render a graphical image of said mobile device from said mobile device vector data, said mobile device remote observation misalignment risk includes mobile device remote observation alignment parameters, said adaptive render includes adaptive render parameters, said mobile device remote observation alignment parameters and said adaptive render parameters are correlated, said reconcile mobile device remote observation alignment includes communicating a subsequent log of said mobile device vector data, said mobile device remote observation alignment parameters and said adaptive render parameters are calibrated to command a predictive render, and a heartbeat to further command a predictive render.

38. A telematics mobile device visualization apparatus comprising:

at least one mobile device, said at least one mobile device including a microprocessor, memory and firmware, said microprocessor, memory and firmware capable of executing a first distributed process, at least one remote device, said at least one remote device including a microprocessor, memory and software, said microprocessor, memory and software capable of executing a second distributed process, said at least one mobile device and said at least one remote device capable of communication, a first distributed process for a mobile device, a second distributed process for a remote device, said first distributed process and said second distributed process capable of communicating messages and data, said first distributed process capable to monitor said mobile device to log and communicate mobile device vector data to said remote device, said first distributed process capable to sense a mobile device remote observation misalignment risk and reconcile mobile device remote observation alignment, said second distributed process capable to adaptive render a graphical image of said mobile device from said mobile device vector data, said mobile device remote observation misalignment risk includes mobile device remote observation alignment parameters, said adaptive render includes adaptive render parameters, said mobile device remote observation alignment parameters and said adaptive render parameters are correlated said reconcile mobile device remote observation alignment includes communicating a subsequent log of said mobile device vector data, said mobile device remote observation alignment parameters and said adaptive render parameters are correlated to command a predictive render, and a heartbeat to further command a predictive render.

39. A telematics mobile device visualization apparatus comprising:

at least one mobile device, said at least one mobile device including a microprocessor, memory and firmware, said microprocessor, memory and firmware capable of executing a first distributed process, at least one remote device, said at least one remote device including a microprocessor, memory and software, said microprocessor, memory and software capable of executing a second distributed process, said at least one mobile device and said at least one remote device capable of communication, a first distributed process for a mobile device, a second distributed process for a remote device, said first distributed process and said second distributed process capable of communicating messages and data, said first distributed process capable to monitor said mobile device to log and communicate mobile device vector data to said remote device, said first distributed process capable to sense a mobile device remote observation misalignment risk and reconcile mobile device remote observation alignment, said second distributed process capable to adaptive render a graphical image of said mobile device from said mobile device vector data, said mobile device remote observation misalignment risk includes mobile device remote observation alignment parameters, said adaptive render includes adaptive render parameters, said mobile device remote observation alignment parameters and said adaptive render parameters are correlated said reconcile mobile device remote observation alignment includes communicating a subsequent log of said mobile device vector data, said mobile device remote observation alignment parameters and said adaptive render parameters are calibrated to command a predictive render, and a heartbeat to further command a predictive render.

* * * * *